US007297170B2

(12) United States Patent
Welygan et al.

(10) Patent No.: US 7,297,170 B2
(45) Date of Patent: *Nov. 20, 2007

(54) METHOD OF USING ABRASIVE PRODUCT

(75) Inventors: Dennis G. Welygan, Woodbury, MN (US); Jason A. Chesley, Hudson, WI (US); Louis S. Moren, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/247,039

(22) Filed: Oct. 11, 2005

(65) Prior Publication Data

US 2006/0156634 A1 Jul. 20, 2006

Related U.S. Application Data

(60) Continuation-in-part of application No. 11/017,334, filed on Dec. 20, 2004, now Pat. No. 7,044,989, which is a continuation-in-part of application No. 10/985,288, filed on Nov. 10, 2004, and a continuation-in-part of application No. 10/985,287, filed on Nov. 10, 2004, now Pat. No. 6,969,412, which is a division of application No. 10/205,711, filed on Jul. 26, 2002, now Pat. No. 6,833,014.

(51) Int. Cl.
*B24B 1/00* (2006.01)

(52) U.S. Cl. .............. 51/298; 51/307; 51/309; 51/293; 451/28; 451/526; 451/529

(58) Field of Classification Search .............. 51/298, 51/307, 308, 309, 293; 451/28, 526, 539
See application file for complete search history.

(56) References Cited

U.S. PATENT DOCUMENTS

| 2,115,897 | A | 5/1938 | Wooddell et al. |
|---|---|---|---|
| 3,041,156 | A | 6/1962 | Rowse et al. |
| 3,048,482 | A | 8/1962 | Hurst |
| 3,605,349 | A | 9/1971 | Anthon |
| 3,906,684 | A | 9/1975 | Marshall et al. |
| 4,311,489 | A | 1/1982 | Kressner |
| 4,314,827 | A | 2/1982 | Leitheiser et al. |
| 4,355,489 | A | 10/1982 | Heyer et al. |
| 4,486,200 | A | 12/1984 | Heyer et al. |
| 4,609,581 | A | 9/1986 | Ott |
| 4,623,364 | A | 11/1986 | Cottringer et al. |
| 4,644,703 | A | 2/1987 | Kaczmarek et al. |
| 4,652,275 | A | 3/1987 | Bloecher et al. |
| 4,744,802 | A | 5/1988 | Schwabel |
| 4,770,671 | A | 9/1988 | Monroe et al. |
| 4,773,920 | A | 9/1988 | Chasman et al. |
| 4,799,939 | A | 1/1989 | Bloecher et al. |
| 4,881,951 | A | 11/1989 | Monroe et al. |
| 4,930,266 | A | 6/1990 | Calhoun et al. |
| 4,997,461 | A | 3/1991 | Markhoff-Matheny et al. |
| 5,009,675 | A | 4/1991 | Kunz et al. |
| 5,011,508 | A | 4/1991 | Wald et al. |
| 5,014,468 | A | 5/1991 | Ravipati et al. |
| 5,039,311 | A | 8/1991 | Bloecher |
| 5,042,991 | A | 8/1991 | Kunz et al. |
| 5,085,671 | A | 2/1992 | Martin et al. |
| 5,107,626 | A | 4/1992 | Mucci |
| 5,190,568 | A | 3/1993 | Tselesin |
| 5,199,227 | A | 4/1993 | Ohishi |
| 5,213,591 | A | 5/1993 | Celikkaya et al. |
| 5,254,194 | A | 10/1993 | Ott |
| 5,417,726 | A | 5/1995 | Stout et al. |
| 5,435,816 | A | 7/1995 | Spurgeon et al. |
| 5,437,754 | A | 8/1995 | Calhoun |
| 5,500,273 | A | 3/1996 | Holmes et al. |
| 5,505,747 | A | 4/1996 | Chesley et al. |
| 5,551,961 | A | 9/1996 | Engen et al. |
| 5,567,540 | A | 10/1996 | Stone et al. |
| 5,573,619 | A | 11/1996 | Benedict et al. |
| 5,578,098 | A | 11/1996 | Gagliardi et al. |
| 5,611,827 | A | 3/1997 | Hammerstrom et al. |
| 5,672,097 | A | 9/1997 | Hoopman |
| 5,672,186 | A | 9/1997 | Chesley |
| 5,681,217 | A | 10/1997 | Hoopman et al. |
| 5,681,361 | A | 10/1997 | Sanders |

(Continued)

FOREIGN PATENT DOCUMENTS

| EP | 0 702 615 B1 | 10/1997 |
|---|---|---|
| GB | 2094824 A | 9/1982 |
| JP | 62-238724 A | 10/1987 |
| JP | 02-083172 | 3/1990 |
| JP | 4-159084 | 6/1992 |
| JP | 7-237126 | 9/1995 |

*Primary Examiner*—Michael Marcheschi
(74) *Attorney, Agent, or Firm*—Thomas M. Spielbauer

(57) ABSTRACT

The invention provides a method and apparatus for making an abrasive product comprising providing a substantially horizontally deployed flexible backing having a first surface bearing an at least partially cured primer coating and an opposite second surface; providing a dry flowable particle mixture comprising abrasive particles and particulate curable binder material; depositing a temporary layer comprising said particle mixture on the at least partially cured primer coating of the first surface of the backing; softening said particulate curable binder material to provide adhesion between adjacent abrasive particles; embossing the layer comprising softened particulate curable binder material and abrasive particles to provide a pattern of raised areas and depressed areas and curing the softened particulate curable binder material to convert the embossed layer into a permanent embossed layer comprised of cured particulate binder material and abrasive particles and cure the at least partially cured primer coating on the first surface of the backing. The invention also provides an abrasive product having an embossed surface made by the method.

6 Claims, 9 Drawing Sheets

U.S. PATENT DOCUMENTS

| | | |
|---|---|---|
| 5,785,784 A | 7/1998 | Chesley et al. |
| 5,786,430 A | 7/1998 | Kaplan et al. |
| 5,820,450 A | 10/1998 | Calhoun |
| 5,872,192 A | 2/1999 | Kaplan et al. |
| 5,942,015 A * | 8/1999 | Culler et al. .................. 51/295 |
| 5,976,204 A | 11/1999 | Hammarstrom et al. |
| 6,024,824 A | 2/2000 | Krech |
| 6,121,143 A | 9/2000 | Messner et al. |
| 6,139,594 A | 10/2000 | Kincaid et al. |
| 6,197,076 B1 | 3/2001 | Braunschweig |
| 6,228,133 B1 | 5/2001 | Thurber et al. |
| 6,299,508 B1 | 10/2001 | Gagliardi et al. |
| 6,312,484 B1 | 11/2001 | Chou et al. |
| 6,569,494 B1 | 5/2003 | Chambers et al. |
| 6,645,624 B2 * | 11/2003 | Adefris et al. .............. 428/402 |
| 6,679,758 B2 | 1/2004 | Bright et al. |
| 6,833,014 B2 | 12/2004 | Welygan et al. |
| 2003/0150169 A1 | 8/2003 | Annen |
| 2003/0213182 A1 | 11/2003 | Knapp et al. |
| 2005/0081455 A1 | 4/2005 | Welygan et al. |
| 2005/0130568 A1 | 6/2005 | Welygan et al. |

\* cited by examiner

500 μm

500 μm

METHOD OF USING ABRASIVE PRODUCT

RELATED APPLICATION

This application is a continuation-in-part of prior U.S. application Ser. No. 11/017,334, filed on Dec. 20, 2004, issued as U.S. Pat. No. 7,044,989, which is a continuation-in-part of prior application Ser. Nos. 10/985,288 and 10/985,287, issued as U.S. Pat. No. 6,969,412, both filed Nov. 10, 2004, which are divisional applications of prior application Ser. No. 10/205,711, filed on Jul. 26, 2002, issued as U.S. Pat. No. 6,833,014. U.S. application Ser. Nos. 10/985,288; 10/985,287; and 10/205,711 are incorporated herein by reference.

FIELD OF THE INVENTION

The present invention relates generally to flexible abrasive products which include a backing which bears shaped abrasive structures, a method of making and using the same, and an apparatus for making the same.

BACKGROUND ART

Abrasive products are available in any of a variety of types, each generally being designed for specific applications and no particular type providing a universal abrading tool for all applications. The various types of abrasive products include, for example, coated abrasives, bonded abrasives, and low-density or nonwoven abrasive products (sometimes called surface conditioning products). Coated abrasives typically comprise abrasive granules generally uniformly distributed over and adhered to the surface of a flexible backing. Bonded abrasives, a typical example of which is a grinding wheel, generally comprises abrasive material rigidly consolidated together in a mass in the form of a rotatable annulus or other shapes such as a block-shaped honing stone. Low density or nonwoven abrasive products typically include an open, lofty, three-dimensional fiber web impregnated with adhesive which does not alter the open character of the web and also adheres abrasive granules to the fiber surfaces of the web.

Bonded abrasive products such as grinding wheels are very rigid and, thus, not conformable to workpieces which have a complex surface. Coated abrasives are often used as abrasive belts or abrasive discs. Coated abrasive belts and discs have a high initial cut rate and produce a high surface roughness when new, but each of these properties drops off very rapidly in use. Coated abrasive products also have a somewhat limited degree of conformability when they are supported in an abrading machine. While use of abrasive belts on soft back-up wheels provides some degree of conformability, the lack of stretchability of the coated abrasive backing limits somewhat its conformability.

Abrasive products are used industrially, commercially, and by individual consumers to prepare any of a variety of materials for use or for further processing. Exemplary uses of abrasive products include preliminary preparation of a surface before priming or painting, cleaning the surface of an object to remove oxidation or debris and grinding or abrading an object to obtain a specific shape. In these applications, abrasive products may be used to grind a surface or workpiece to a certain shape or form, to abrade a surface to clean or to facilitate bonding of a coating such as paint, or to provide a desired surface finish, especially a smooth or otherwise decorative finish.

The grinding or finishing properties of the abrasive product may be tailored to some degree to provide a desired aggressive level of removal of material from a surface being abraded ("cut"), balanced with the need for a particular surface finish ("finish"). These needs may also be balanced with the need for a relatively long, useful life for the abrasive product. Typically, however, the cut and finish performance during the useful life of an abrasive product is not as consistent as desired. That is, during the useful life of typical abrasive products, the cut and finish of the product may vary with cumulative use. A need, therefore, exists for abrasive products with increased consistency of cut and finish. Such new products that also bridge the cut and finish performance between coated abrasive products and surface conditioning products would be especially useful.

Many methods of making abrasive products employ liquid or solvent-borne volatile organic binder materials which result in the unwanted creation of volatile organic compound (VOC) emissions. Some binder materials are water-borne and, thus, require an unwanted expense because of the additional energy cost in removing the water. Moreover, some methods of making abrasive products are complex, requiring multiple steps and complex equipment. A simplified process to produce such new abrasive products providing economical short product cycles and low or minimal volatile organic waste products would be particularly useful.

Thus, need exists for a flexible abrasive product which has a tailored cutting ability and a long, useful life which can be made in a simple method without producing undesirable amounts of volatile organic compound waste products.

OTHER RELATED ART

Other related prior art includes the following:
U.S. Pat. No. 2,115,897 (Wooddell et al.)
U.S. Pat. No. 3,048,482 (Hurst)
U.S. Pat. No. 3,605,349 (Anthon)
Great Britain Patent Application No. 2,094,824 (Moore)
U.S. Pat. No. 4,644,703 (Kaczmarek et al.)
U.S. Pat. No. 4,773,920 (Chasman et al.)
Japanese Patent Application No. JP 62-238724A (Shigeharu, published Oct. 19, 1987)
U.S. Pat. No. 4,930,266 (Calhoun et al.)
U.S. Pat. No. 5,014,468 (Ravipati et al.)
U.S. Pat. No. 5,107,626 (Mucci)
Japanese Patent Application No. 02-083172 (Tsukada et al., published Mar. 23, 1990)
Japanese Patent Application No. JP 4-159084 (Nishio et al., published Jun. 2, 1992)
U.S. Pat. No. 5,190,568 (Tselesin)
U.S. Pat. No. 5,199,227 (Ohishi)
U.S. Pat. No. 5,435,816 (Spurgeon et al.)
U.S. Pat. No. 5,437,754 (Calhoun)
U.S. Pat. No. 5,672,097 (Hoopman)
European Patent No. 702,615 (Romero, published Oct. 22, 1997)
U.S. Pat. No. 5,785,784 (Chesley et al.)
U.S. Pat. No. 6,299,508 (Gagliardi et al.)
U.S. Pat. No. 5,976,204 (Hammarstrom, et al.)
U.S. Pat. No. 5,611,827 (Hammarstrom, et al.)
U.S. Pat. No. 5,681,361 (Sanders)
U.S. Pat. No. 6,228,133 (Thurber et al.)
U.S. Pat. No. 5,578,098 (Gagliardi et al.)
U.S. Pat. No. 5,039,311 (Bloecher)
U.S. Pat. No. 4,486,200 (Heyer et al.)

SUMMARY OF THE INVENTION

The invention provides an abrasive product, a method of making the same without creating substantial quantities of unwanted volatile organic compound emissions or water evaporation expense and a method of using the same. The invention also provides an apparatus for making the abrasive product.

The novel abrasive product includes a flexible backing onto which is bonded a plurality of shaped structures comprising abrasive particles adhered together with a cured binder material.

In one aspect, the invention provides a method of making an abrasive product comprising:

a. providing a substantially horizontally deployed flexible backing having a first surface bearing an at least partially cured primer coating and an opposite second surface;

b. providing a dry flowable particle mixture comprising abrasive particles and particulate curable binder material;

c. depositing a plurality of temporary shaped structures comprising the particle mixture on the at least partially cured primer coating of the first surface of the backing;

d. softening the particulate curable binder material to provide adhesion between adjacent abrasive particles and provide a plurality of deformable structures having a distal end spaced from the backing and an attachment end adhered to the primer coated backing;

e. embossing the distal ends of the deformable structures to provide a pattern of raised areas and depressed areas; and f. curing the softened particulate curable binder material to convert said temporary shaped structures into permanent shaped structures and cure the at least partially cured primer coating on the first surface of the backing. Preferred particulate binder materials are selected from the group consisting of thermoset binders and thermoplastic binders. Preferred particulate curable binder materials are selected from the group consisting of phenolic resins, epoxy resins, polyester resins, copolyester resins, polyurethane resins, polyamide resins and mixtures thereof.

The method of the invention may include additional steps as follows:

a. optionally, applying an additional coating at least partially over the permanent shaped structures; and b. curing said optional additional coating over the permanent structures.

The invention further provides a flexible abrasive product which comprises:

a. a flexible backing having a first surface bearing a primer coating, an opposite second surface and opposite ends; and b. a plurality of shaped structures, each structure having a distal end bearing a shaped pattern spaced from the backing and an attachment end attached to the primer coating on the backing, the shaped structures comprising abrasive particles and cured particulate binder.

The invention also provides an apparatus for making a flexible abrasive product comprising:

a. a frame for supporting and dispensing a flexible backing having a first surface and an opposite second surface with the first surface deployed in a substantially horizontal deployment;

b. a primer dispensing system for depositing curable primer material over the first surface of the backing;

c. a primer curing system for at least partially curing the curable primer material to provide a primer coating on the first surface of the backing;

d. a dispensing apparatus for receiving a mixture of particulate curable binder material and abrasive particles and depositing a plurality of temporary shaped structures comprising the mixture of particulate curable binder material and abrasive particles on the at least partially cured primer coating of the first surface of the backing;

e. a particulate binder softening system for softening the particulate curable binder so that it will adhere adjacent abrasive particles;

f. an embossing apparatus for embossing the softened particulate curable binder mixture to modify the distal end surface of the structures to provide a pattern of raised areas and depressed areas;

g. a particulate binder curing system for curing the particulate curable binder material and for curing the at least partially cured primer coating to convert the temporary shaped structures into permanent shaped structures adhered to the cured primer coating on the first surface of the backing;

h. an optional dispensing apparatus for receiving and dispensing an additional coating at least partially over the permanent shaped structures;

i. an optional curing system to cure any optional coating; and j. an optional flexing apparatus for flexing the backing bearing the cured permanent shaped structures.

The invention also provides a method of abrading a surface of a workpiece. The method comprises:

a. providing an abrasive product comprising:
  i. a flexible backing having a first surface bearing a cured primer coating, an opposite second surface and opposite ends; and
  ii. a plurality of shaped structures each structure having a distal end bearing a shaped pattern spaced from the backing and an attachment end attached to the primer coating on the backing, the shaped structures comprising abrasive particles and cured particulate binder;

b. contacting the surface of the workpiece with the distal ends of the shaped structures; and c. relatively moving at least one of the workpiece or the abrasive product while providing sufficient force between the workpiece surface and the distal ends of the shaped structures of the abrasive product to abrade or otherwise modify the surface.

The invention further provides a method of making an abrasive product, the method comprising:

a. providing a substantially horizontally deployed flexible backing having a first surface bearing an at least partially cured primer coating and an opposite second surface;

b. providing a dry flowable particle mixture comprising abrasive particles and particulate curable binder material;

c. depositing the particle mixture on the at least partially cured primer coating of the first surface of the backing to form a sheet;

d. softening the particulate curable binder material to provide adhesion between adjacent abrasive particles;

e. cutting or embossing the sheet to provide a plurality of abrasive bodies, each having an attachment end attached to the primer coating on the backing and a distal end spaced from the backing;

f. curing the softened particulate curable binder material to convert the abrasive bodies into permanent abrasive bodies and cure the at least partially cured primer coating on the first surface of the backing; and g. optionally flexing the sheet of cured particulate curable binder material.

The invention further provides:

A flexible abrasive product comprising:

a. a flexible backing having a first surface bearing a primer coating, an opposite second surface and opposite ends; and b. a plurality of shaped structures, each structure having a distal end bearing a shaped pattern spaced from the backing and an attachment end attached to the primer coating on the backing, the shaped structures comprising abrasive particles and cured particulate binder.

The invention further provides:

An abrasive product comprising:

a. a flexible backing having a first surface bearing a cured primer coating, an opposite second surface and opposite ends; and b. an embossed abrasive layer comprising abrasive particles and cured particulate binder material adhered to the cured primer coating on said first surface of said backing.

The invention further provides:

An apparatus for making an abrasive product comprising:

a. a frame for supporting and dispensing a flexible backing having a first surface and an opposite second surface with the first surface deployed in a substantially horizontal deployment;

b. a primer dispensing system for depositing curable primer material over the first surface of the backing;

c. a primer curing system for at least partially curing the curable primer material to provide a primer coating on the first surface of the backing;

d. a dispensing apparatus for receiving a mixture of particulate curable binder material and abrasive particles and depositing a layer comprising the mixture of particulate curable binder material and abrasive particles on the at least partially cured primer coating of the first surface of the backing;

e. a particulate binder softening system for softening the particulate curable binder so that it will adhere adjacent abrasive particles to provide a layer comprising softened curable binder and abrasive particles;

f. an embossing apparatus for embossing the layer comprising softened particulate curable binder adhesive particles to provide therein a pattern of raised areas and depressed areas;

g. a particulate binder curing system for curing the particulate curable binder material and for curing the at least partially cured primer to provide a layer comprising cured binder material and abrasive particles having an embossed surface adhered to the cured primer coating on the first surface of the backing and h. an optional flexing apparatus for flexing the backing bearing the cured permanent separated shaped structures.

The invention further provides:

An abrasive product comprising:

a. a flexible backing having a first surface and an opposite second surface;

b. a cured primer coating over the first surface; and c. an abrasive layer having an embossed upper surface including a pattern of raised areas and depressed areas comprised of abrasive particles and cured particulate binder adhered to the cured primer coating.

Definition of Terms

The term "backing" shall mean a flexible sheet material which will withstand use conditions of an abrasive product of the type herein described.

The term "shaped structures" shall mean a structure having three dimensions including height, width and depth, such as a cube, rectangular block, right cylinder, rib, truncated cone or truncated pyramid.

The term "temporary shaped structure" shall mean a shaped structure comprising components in a transitory state which may be easily deformed by slight contact until it is converted to a permanent shaped structure.

The term "particulate curable binder material" shall mean binder materials which are solid at room temperature, have been processed to provide particles, and which may be softened and cured either upon heating and subsequent cooling, if thermoplastic, or upon sufficient exposure to heat or other suitable energy source, if thermosetting or cross-linkable.

The term "cured particulate binder" shall mean a binder that was formerly particulate which has been softened and cured to form a cured mass of binder which no longer has particulate characteristics.

The term "at least partially cured primer" with reference to the primer coating shall mean the material forming the primer coating is sufficiently cohesive to be handleable but not fully cross-linked, if thermosetting, or not fully fused, if thermoplastic.

The term "deformable structure" shall mean a shapeable mass comprised of a mixture of softened particulate curable binder material and abrasive particles prior-to the curing of the curable binder material.

The term "permanent shaped structure" shall mean a shaped structure which will not be altered by slight contact except when it is employed to abrade or otherwise modify the surface of a workpiece.

The term "softening" with reference to the particulate binder material shall mean converting the particulate binder material from a solid having a defined particle shape to a physical form which no longer has the defined shape but instead is flowable as a liquid, viscous liquid, or semi-liquid mass.

The term "cured" with reference to the curable binder or primer material means that the material has been hardened to such a degree that the resulting product will function as an abrasive product.

The term "substantially horizontally deployed" with reference to the deployment of the backing shall mean deployed in a manner so that a temporary shaped structure comprising a dry particulate mixture deposited on a surface of the backing will not be altered in shape because of particle movement caused by any incline from actual horizontal of the backing deployment. That is, the backing may be deployed moderately from an actual horizontal deployment.

The term "dry," when used to describe the particulate curable binder material, means essentially free of liquid phase substances to the extent that the particulate curable binder material remains particulate, although a minor amount of a liquid may be added as a modifier which typically will not alter the particulate character of the particulate curable binder material.

The term "shaped pattern" when referring to the distal ends of the structures shall mean having raised areas and depressed areas.

The term "precisely shaped" when used to describe the pattern on the distal ends of the structures shall mean a pattern which is the inverse of that obtained by use of a mold having cavities and raised areas that is used to impart such pattern to the softened distal ends of the structures.

The term "embossed surface" when referring to the surface of the abrasive layer shall mean, after being subjected to an embossing roll or plate, the surface of the layer is endowed with a pattern of raised areas and depressed areas which may extend to the surface of the backing.

BRIEF DESCRIPTION OF THE DRAWINGS

The invention is further illustrated by reference to the drawings wherein.

DETAILED DESCRIPTION OF THE INVENTION

Figure 1:
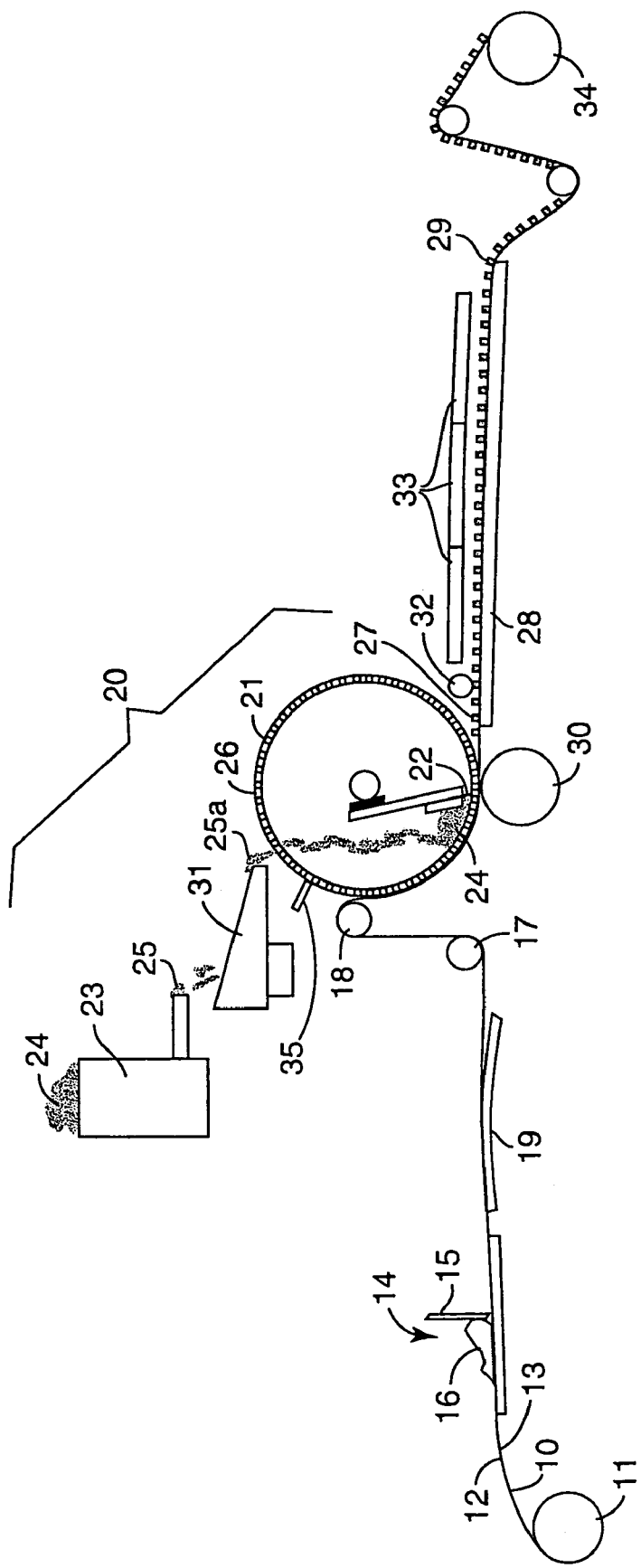
FIG. 1 is a schematic drawn representation of one process and apparatus for making an abrasive product according to the invention.

FIG. 1 is a schematic drawn representation of one process for making an abrasive product according to the present invention. The apparatus depicted in FIG. 1 includes a frame, not shown in detail, for supporting and dispensing a flexible backing 10 from a supply source such as roll 11. Preferred flexible backings are selected from the group consisting of paper, woven fabrics, nonwoven fabrics, calendered nonwoven fabrics, polymeric films, stitch bonded fabrics, open cell foams, closed cell foams and combinations thereof. Backing 10 has a first surface 12 and an opposite second surface 13 and is dispensed so that the first surface 12 is deployed in a substantially horizontal deployment. A primer dispensing station 14 includes a supply chamber for receiving primer material 16 and a knife coater 15 for coating a thin layer of primer material 16 over first surface 12. The primer coating is preferably applied as a powder and may comprise a mixture of at least two different binder materials. Preferably, the primer material is a thermosetting binder. Preferred primers are particulate mixtures of first particles of a thermosettable resin (e.g., a thermosettable polyester resin) and second particles of thermoplastic resin particles (e.g., thermoplastic polyester particles).

The powdered primer material is initially loosely but uniformly deposited onto first surface 12 of backing 10. The coater of the primer dispensing station is depicted as a knife coater but the primer could also be applied using any of a variety of other known coating methods such as an electrostatic sprayer or dropping from a metering belt or vibratory device. The primer coating could also be deposited in a discontinuous pattern similar to the pattern employed for the permanent shaped structures, such that the primed areas are subsequently aligned with the permanent shaped structures. Backing 10 bearing the coating of primer material is conducted over the initial portion of heated surface 19 which is fitted with multiple heaters so that the initial portion of heated surface 19 is at a different temperature than the final portion of the heated surface 19 such that, as the backing bearing the coating of primer material exits the heated surface 19, the powdered primer material is no longer powdery but is partially, but not completely, cured. The temperature may vary, for example, from 100° C. (212° F.) at the initial part of heated surface 19 to, for example, 150° C. (302° F.) at the exit portion of heated surface 19. The primer coating station and curing station may be eliminated if a backing is primed in a separate operation. Alternatively, one or more additional primer or tie coat coatings may be applied to the partially cured primer coating. Such additional coatings may be applied by powder coating or other techniques known in the art. The primer may alternatively be provided by the backing, for example, through the incorporation of hot-melt adhesive fibers or particulates into the structure of the backing.

The backing 10 bearing the partially cured primer material is then conducted around idler roll 17 and deployed in a vertical direction until it reaches idler roll 18 whereupon it is directed in a downward direction. A dispensing apparatus 20 includes a volumetric feeder 23, vibratory feeder 31, perforated drum 21 including an internal wiper blade 22, optional external cleaning bar 35 and a driven backup roll 30. A mixture 24 of particulate curable binder material and abrasive particles is introduced into volumetric feeder 23 which deposits a flow 25 of the particulate mixture 24 into vibratory feeder 31 which produces uniform sheet-like flow 25a depositing the mixture through openings 26 in perforated drum 21. This equipment is preferred because it produces a uniform sheet-like flow. It should be noted, however, that alternative equipment may be employed to achieve the same result. Cleaning bar 35 is positioned to remove unwanted particulate material from the exterior surface of drum 21. Wiper blade 22 is positioned within drum 21 to collect the mixture 24 of particles and dispense temporary shaped structures 27 from openings 26 as perforated drum 21 is rotated in a counter clockwise direction. Rotation of drum 21 is continued as backing 10 bearing the partially cured primer coating is conducted over idler roll 18 and around perforated drum 21, resulting in deposition of temporary shaped structures 27 on the partially cured primer coated surface of backing 10.

Figure 2:
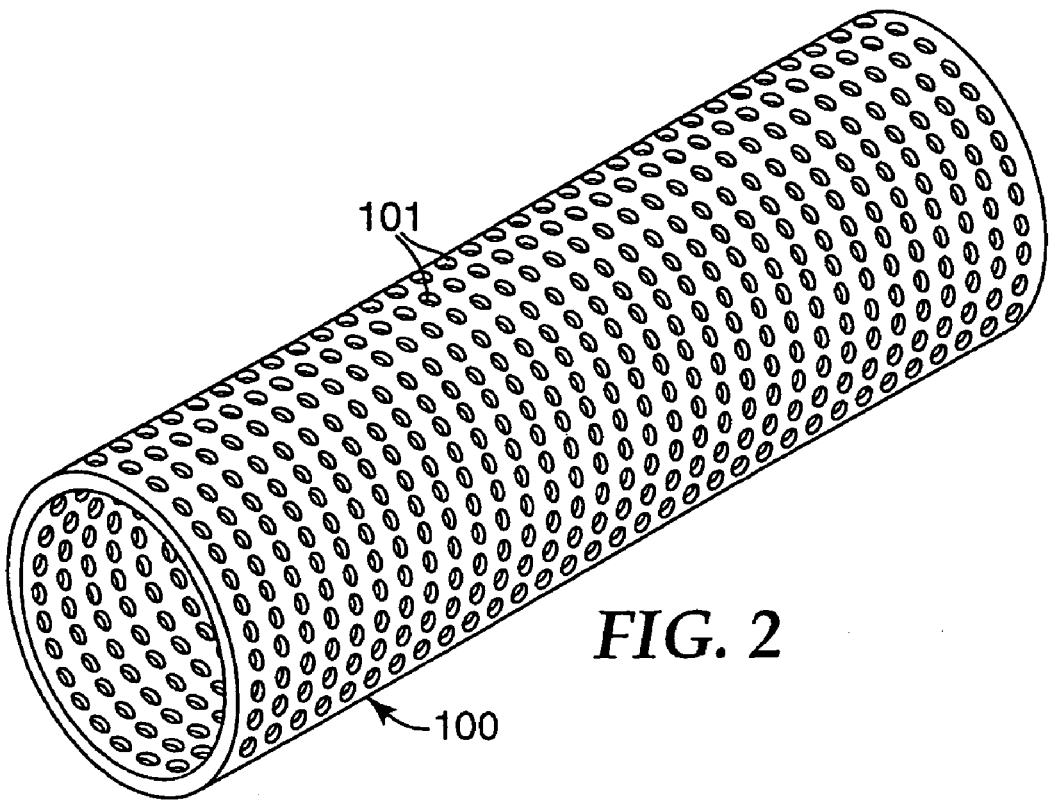
FIGS. 2 and 3 are drawn representations shown in perspective view of perforated drums which may form part of the apparatus shown in FIG. 1.
Figure 3:
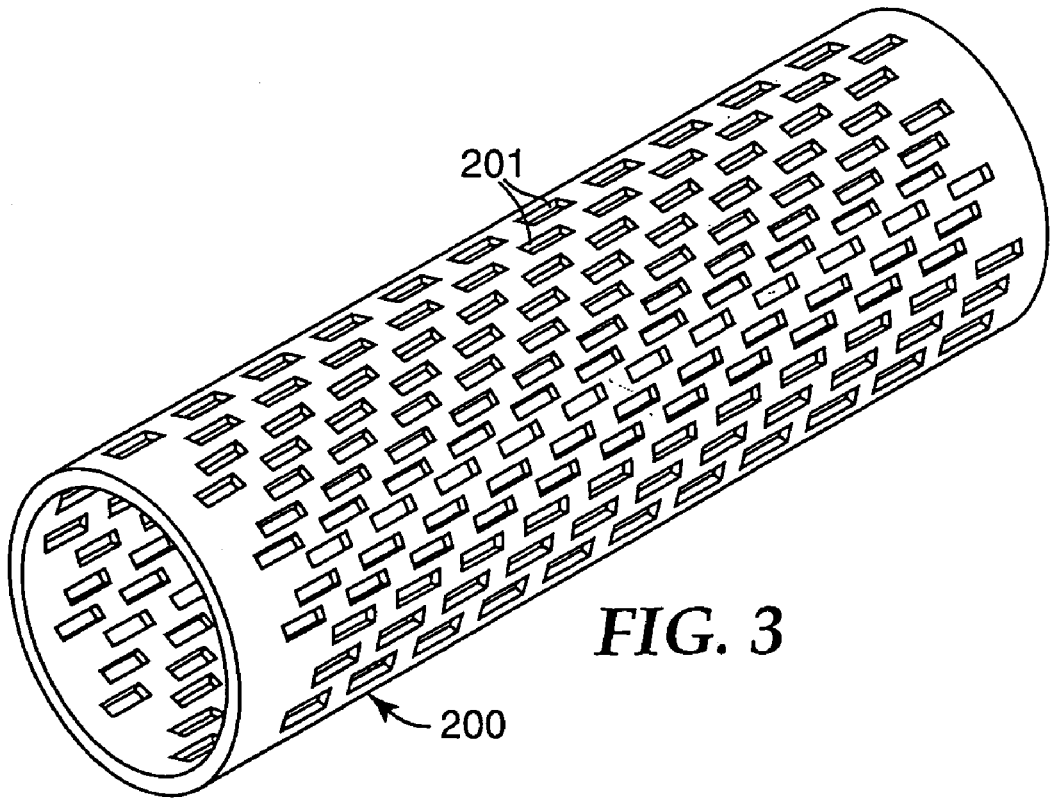

FIGS. 2 and 3 show drawn representations of alternative drums which may serve as drum 21. FIG. 2 shows drum 100 having a multiplicity of openings 101. Drum 100 may have an outer diameter on the order of 10 to 100 centimeters, hereafter abbreviated "cm" (3.9 to 39 inches, hereafter abbreviated "in"), a length of 20 to 120 cm (7.9 to 47 in) and a wall thickness of 0.25 to 6.35 mm (0.010 to 0.25 in). Openings 101 may range from about 0.76 to 30 mm (0.03 to 1.18 in). The material forming drum 100 should be sufficient to withstand the processing conditions described. Material suitable for forming drum 100 includes stainless steel, cold rolled steel, metal alloys, electrodeposited nickel, and plastic materials such as polytetrafluroethylene, e.g., that sold under the trade designation TEFLON. As depicted in FIG. 3, which shows drum 200 having a multiplicity of openings 201, the openings in the drum may take any of a variety of shapes. The drum may be replaced with an appropriately mounted perforated belt.

Figure 10:
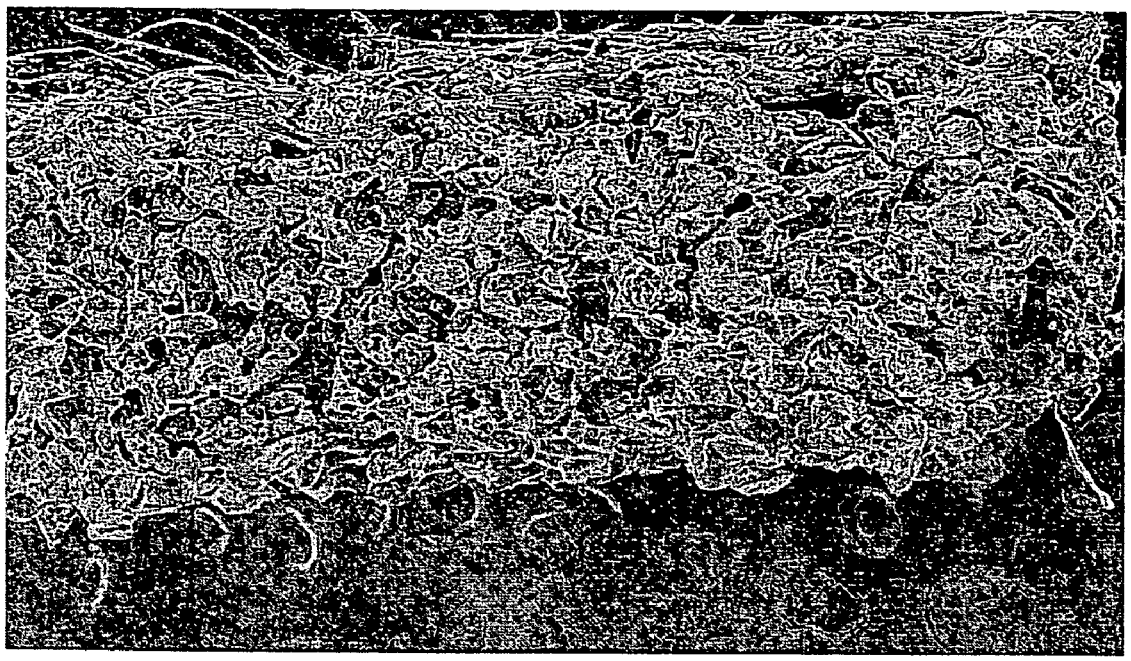
FIG. 10 is a SEM photomicrograph at 33× showing a side view of a fractured shaped structure of an abrasive product according to the invention.
Figure 11:
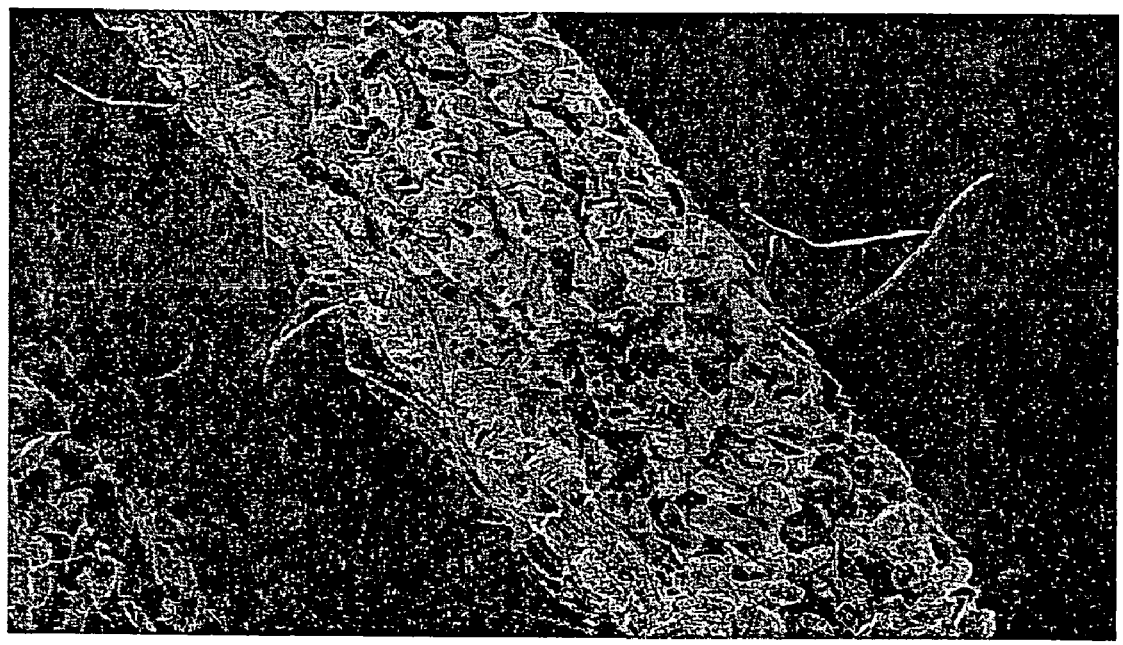
FIG. 11 is a SEM photograph at 33× showing a side view of a fractured shaped structure which was formed by flattening and compressing the distal end of the shaped structure of an abrasive product of the invention.

Backing 10, thus coated, is conducted over heated surface 28 which is fitted with multiple heaters so that it is heated at a temperature range from 150° to 250° C. (302° to 482° F.) with the initial portion of heated surface 28 having a first temperature and the exit portion of the heated surface 28 having a second temperature. The particulate curable binder material is softened as it is initially conducted over heated surface 28, rendering it liquid or semi-liquid, whereupon it becomes flowable and wets, adheres, or otherwise binds adjacent abrasive particles and, as further energy is applied, preferably crosslinks to permanently adhere adjacent abrasive particles to convert the temporary shaped structures into permanent shaped structures 29. When the particulate curable binder material is present as the minor component, that is less than about 50% by volume, the resultant temporary shaped structure is porous in nature, that is, void space exists between the adjacent abrasive particles. Porosity is preferred but not necessary. This porosity contributes to the erosion characteristic of the cured permanently shaped structures. A cooled contact or embossing roll 32, positioned to contact the distal ends of shaped structures 27 after they have softened and become deformable, is allowed to come in contact with the softened shapes, compressing, densifying, leveling, or embossing secondary features to the shaped structures. FIG. 10 shows that when the distal end of the shaped structure is not subjected to contact roll 32, a somewhat irregular distal end is obtained. Contact roll 32 may have a surface pattern which includes raised areas and depressed areas to provide an embossed pattern to the distal ends of the shaped structures. FIG. 11 shows that when the distal end of the shaped structure is subjected to contact roll 32, a more planar distal end is obtained. Additional infrared heaters 33 may be positioned above the heated surface 28 to augment the heat transfer process and enhance the rate of crosslinking or increase the speed at which the process may be conducted. The partially cured primer coating is also preferably crosslinked by being conducted over appropriately heated-surface 28 to permanently adhere the permanent shaped structures to the primer coating on the first surface of the backing. The finished abrasive product is then wound for future conversion onto roll 34.

Figure 9:
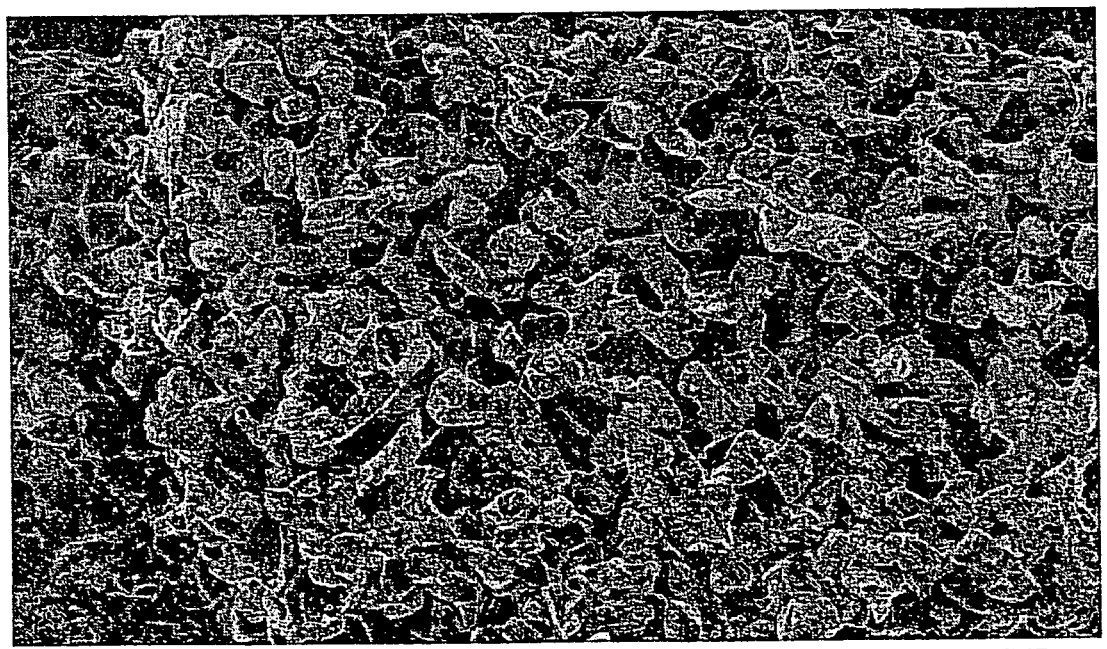
FIG. 9 is a SEM photomicrograph at 33× of the distal end of a shaped structure of an abrasive product according to the invention.

FIG. 9 is a SEM photomicrograph at 33× of the distal end of a shaped structure of an abrasive product according to the invention. FIG. 10 is a SEM photomicrograph at 33× showing a side view of a fractured shaped structure of an abrasive product according to the invention. FIG. 11 is a SEM photograph at 33× showing a side view of a fractured shaped structure, which was formed by flattening and compressing the distal end of the shaped structure of an abrasive product of the invention. Referring to FIGS. 9-11, the shaped structure is characterized by a three dimensional structure comprising solid particles locally bonded together by binder. This three dimensional structure defines a network of interconnected voids.

The temporary shaped structures may be deposited in a random or in an ordered pattern. The pattern is preferably selected in order to prevent imparting undesirable surface features or "tracking" when the product is used in a belt or a disc.

The shape of the shaped structures may be any of a variety of geometric configurations. The base of the shape in contact with the backing may have either a larger or smaller surface area than the distal end of the composite structure. The shaped structures may have a shape selected from the group consisting of cones, truncated cones, three-sided pyramids, truncated three-sided pyramids, four-sided pyramids, truncated four-sided pyramids, rectangular blocks, cubes, right cylinders, erect open tubes, hemispheres, right cylinders with hemispherical distal ends, erect ribs, erect ribs with rounded distal ends, polyhedrons and mixtures thereof. The shape of the structure may be selected from among any of a number of other geometric shapes such as a prismatic, parallelepiped, or posts having any cross section. Generally, shaped structures having a pyramidal structure have three, four, five or six sides, not including the base. Such pyramidal structures may have planar or parabolic sides and may have distal ends (peaks) that are not centrally projected onto their respective bases. Such pyramidal structures may be undercut with respect to their bases such that projection of their peaks into the plane of their respective bases is not coincident with their respective base area. The cross-sectional shape of the shaped structure at the base may differ from the cross-sectional shape at the distal end. In some cases it is preferred to have shaped structures, e.g., cubes, ribs, right cylinders, having shapes to provide a uniform cross section throughout the thickness of the abrasive product, as it is used, to provide a uniform cut throughout the life of the product. The transition between these shapes may be smooth and continuous or may occur in discrete steps. The shaped structures may also have a mixture of different shapes. The shaped structures may be arranged in rows, spiral, helix, or lattice fashion, or may be randomly placed. The shaped structures may be further modified in their uncured state by methods known in the art. For example, shaped structures may be calendered with a smooth or patterned roll or may be embossed with a screen. Or shaped structures may be created by a suitable embossing tool from a continuous sheet of uncured particulate curable binder material.

The particulate curable binder material may be cured by any of a variety of techniques, depending upon the binder material selected. A thermoplastic binder material will be cured by cooling. A cross-linkable curable binder material may be cured by exposure to an energy source selected from thermal, visible light, ultraviolet light, electron beam, infrared, inductive energy, microwave and combinations thereof.

Optionally, a coating (i.e., a "size" coating) may be applied on at least a portion of the permanent structures and subsequently cured simultaneously with the permanent shaped structures. Alternatively, such an additional coating may be applied to the previously cured permanent shaped structures and cured by any of a variety of techniques known in the art.

Once formed, the abrasive product of the present invention may be converted into any of a variety of shapes such as discs, rectangular sheets, belts, flap wheels, flap discs, wheels formed by compressing and bonding a stack of discs, wheels formed by spirally-winding a sheet of material upon itself, etc., and utilized on any of a variety of workpieces. Such workpieces may be selected from the group consisting of metals, plastics, wood, composites, glass, ceramics, optical materials, painted substrates, plastic coated substrates, automotive exteriors, concrete, stone, laminates, molded plastics, fired clay products, sheetrock, plaster, poured floor materials, gemstones, plastic sheet materials, rubber, leather, fabric and mixtures thereof. The metals may include steel, stainless steel, iron, brass, aluminum, copper, tin, nickel, silver, zinc, gold, platinum, cobalt, chrome, titanium, alloys thereof and mixtures thereof.

Figure 4:
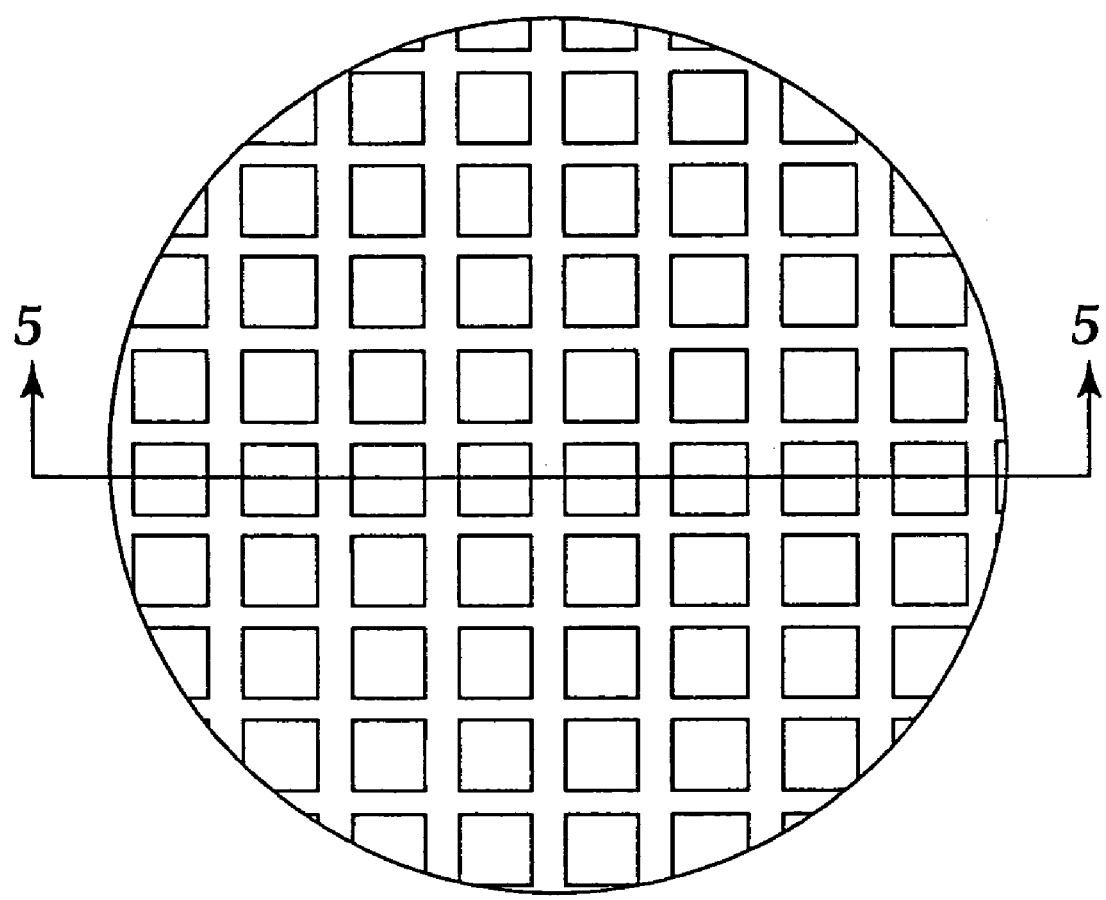
FIG. 4 is a top plan view of a drawn representation of an abrasive disc made in accordance with the present invention.
Figure 5:
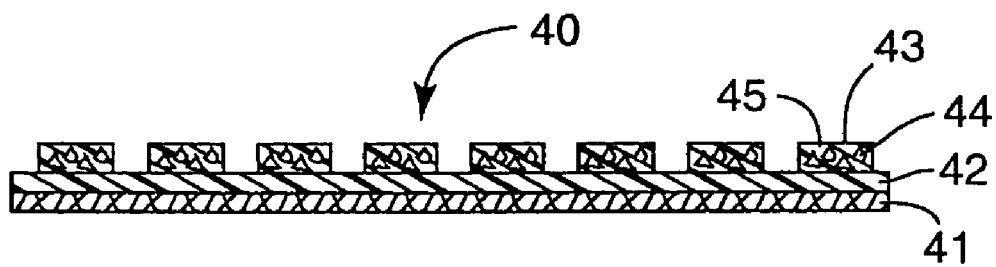
FIG. 5 is an enlarged schematic cross-section drawn representation of a portion of an abrasive product according to the present invention as shown in FIG. 4, taken at line 5-5.

Referring to FIGS. 4 and 5, there is shown in FIG. 4 a top plan view of a drawn representation of an abrasive disc made in accordance with the present invention. FIG. 5 shows an enlarged schematic cross-section drawn representation of a portion of the abrasive product as shown in FIG. 4, taken along line 5-5.

Figure 8:
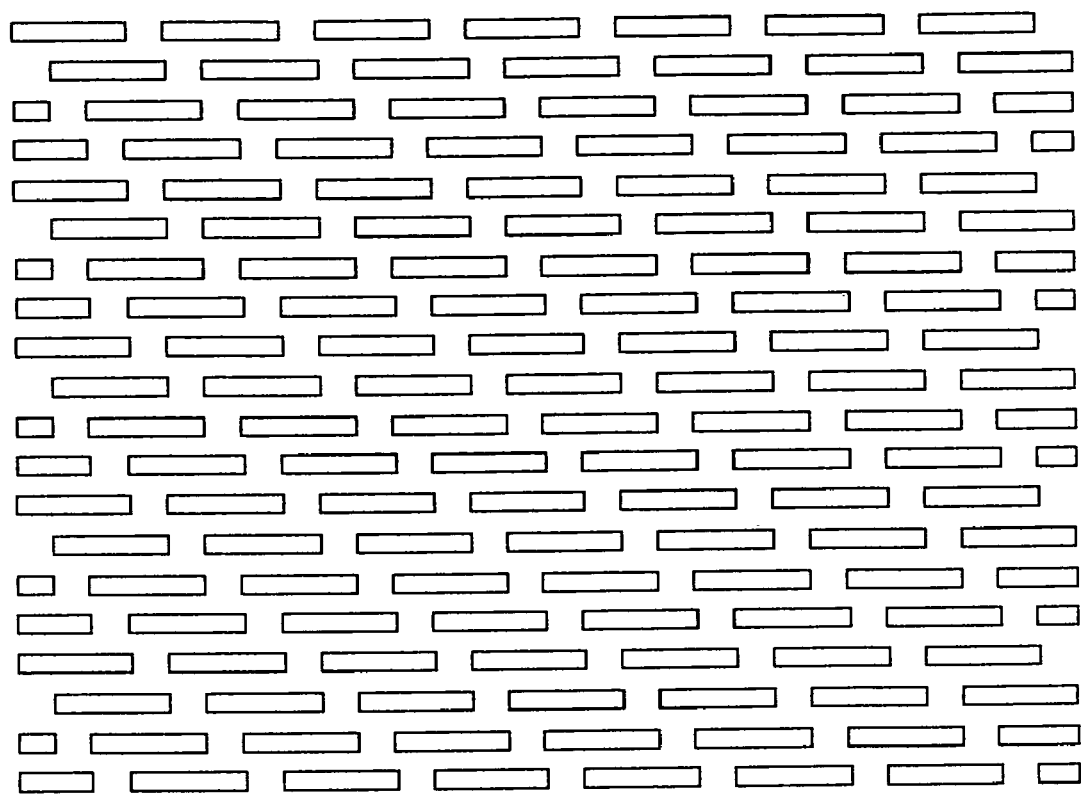
FIG. 8 is a top plan view of an abrasive shape pattern that may be used to make a product in accordance with this invention that generally will not track when used.

The product 40 depicted in FIG. 5, which is not drawn to scale, includes a flexible backing 41, a primer coating 42 and a plurality of shaped abrasive bodies 43, each comprising abrasive particles 44 and cured particulate binder 45. The pattern of shaped abrasive bodies depicted in FIGS. 4 and 5 shows an ordered array with bodies 43 being aligned in rows, both in the machine and in the cross direction. The array of shaped abrasive bodies need not be aligned and in some instances it is preferred to have a random pattern of shaped bodies on the primer coated backing. For example, if the shaped abrasive bodies would cause tracking on the surface of the workpiece being finished, an ordered arrangement may be undesirable unless such tracking is a desired result. FIG. 8 depicts a pattern of openings for the perforated drum which may produce a product with an ordered pattern of shaped structures which typically does not cause tracking.

Figure 6:
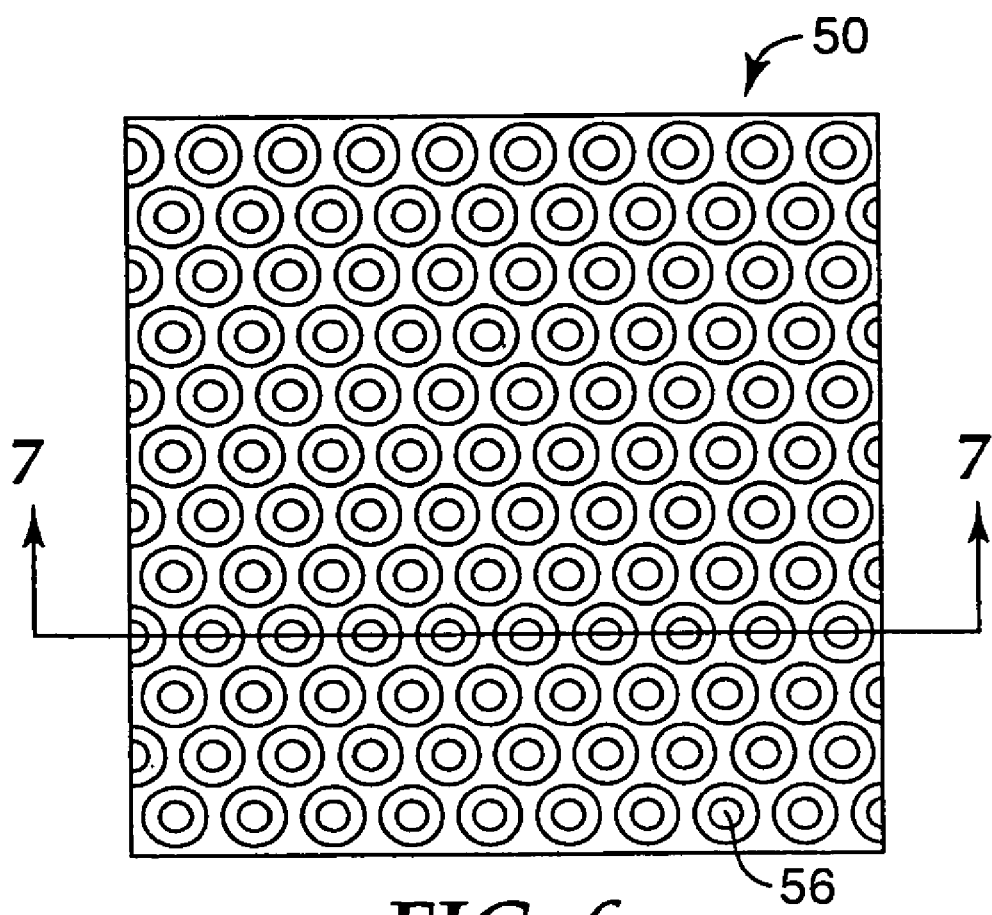
FIG. 6 is a top plan view of a drawn representation of another abrasive product made in accordance with the present invention.
Figure 7:
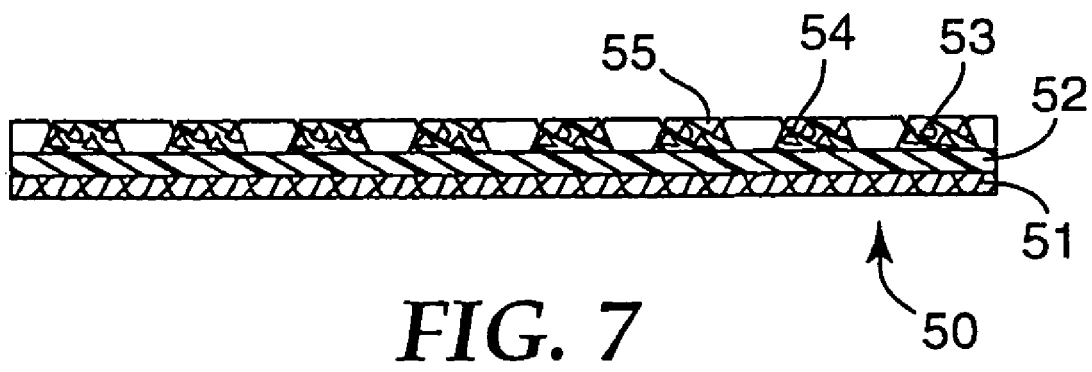
FIG. 7 is an enlarged schematic cross-section drawn representation of a portion of the abrasive product depicted in FIG. 6, taken at line 7-7.

FIGS. 6 and 7, also not drawn to scale, show an abrasive product 50 which includes backing 51, primer coating 52 and a plurality of shaped bodies 53. Each shaped body includes abrasive particles 54 which are bonded together by cured particulate binder material 55. The bodies depicted in FIG. 6 show an arrangement that is, likewise, oriented but not in rows in both the machine and cross directions. The shaped bodies in FIGS. 6 and 7 are truncated cones having flattened tops 56.

Figure 12:
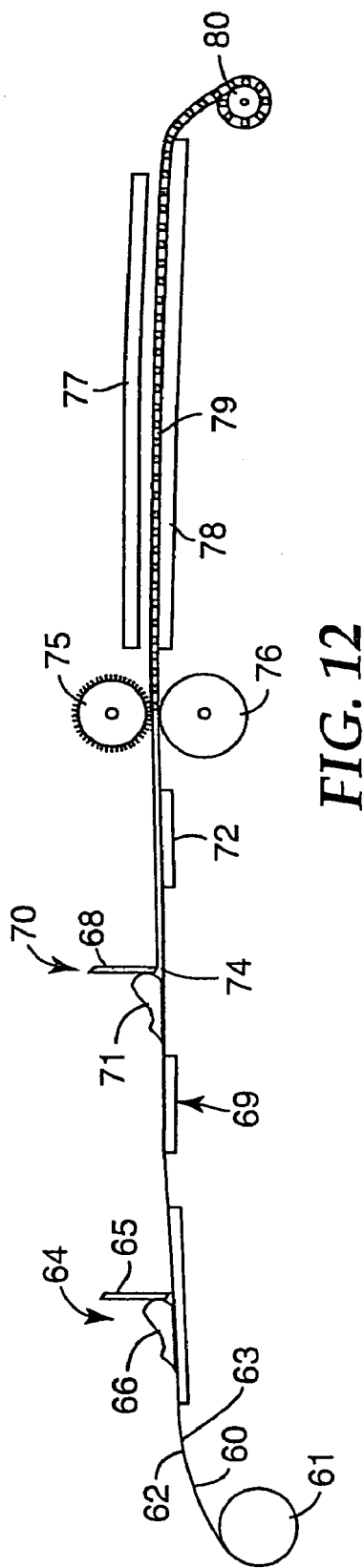
FIG. 12 is a schematic drawn representation of another process and apparatus for making an abrasive product according to the invention.
Figure 13:
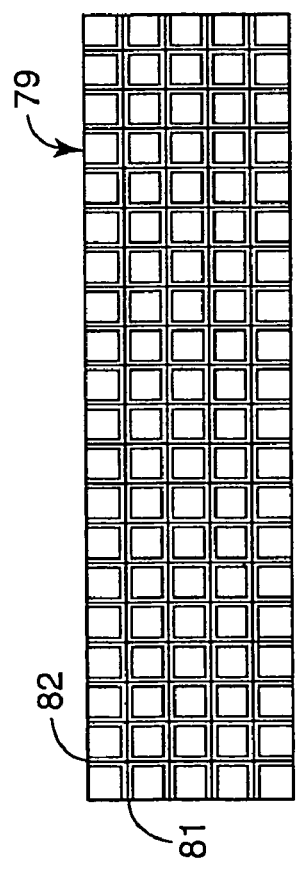
FIG. 13 is a top plan view of the product made with the process shown in FIG. 12.
Figure 14:
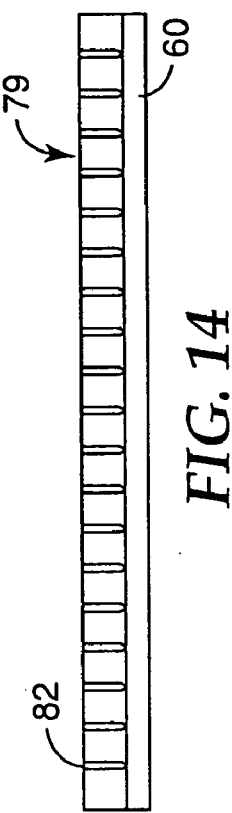
FIG. 14 is a side view of the product shown in FIG. 13.

It should be understood that the apparatus and method depicted in FIG. 1 are not to be construed as the exclusive method and apparatus of making the product of the invention. The method and apparatus depicted in FIG. 1 is the preferred method because it provides a method for rapidly preparing the product of the invention because the various steps are provided sequentially in a continuous process. An alternative method of making the product in a batch process is described hereinafter in Example 1. A further alternative method of making the product may be provided by using a rotary mold comprising a solid roll containing a plurality of cavities having shapes and patterns corresponding to the products described herein. The depressions in the rotary mold would have the appropriate size for receiving the particulate curable binder-abrasive particle mixture as dispensed from dispensing equipment described earlier involving feed devices and a wiping bar on top of the rotary mold and hence form appropriately sized temporary structures. In rotation the temporary structures would be supported by the partially cured primer coated backing introduced against the surface of the roll immediately after the cavity filling step. Upon inverting on the backing, the temporary shaped structures would then be conducted into an appropriately heated zone which would soften or melt the particulate curable binder and provide for bonding between adjacent abrasive particles. Alternatively, a roll containing cavities could be used in conjunction with an additional carrier film or even a meltable spunbond fabric. The carrier film could be either previously formed, formed in situ with vacuum, mechanically formed or thermo-mechanically formed to match the same pattern, size and shape of the cavities. The cavities of the liner could be filled first and then, after receiving the particulate curable binder-abrasive particle mixture, and upon inverting, the liner could assist in a complete transfer of the particulate curable binder-abrasive particle mixture from the roll containing the cavities to the partially cured primer coated backing. Alternatively, the formed films or spunbond fabric could be first filled with the particulate curable binder-abrasive particle mixture in a separate step from formation, and then the filled cavities subjected to heat so as to provide for bonding between adjacent abrasive particles. Alternatively, a perforated belt could be placed over the horizontally deployed backing while a vacuum is drawn beneath the backing covered by the perforated belt to assist in filling the perforations in the perforated belt with particulate curable binder-abrasive particle mixture. The vacuum would be provided to assist in compacting the particulate curable binder-abrasive particle mixture while maintaining its shape upon withdrawal of the forming belt. Another alternative method of making the product may be provided by molding a plurality of the temporary structures in a mold which resembles on a miniaturized scale a pan for baking cupcakes or muffins. The depressions in the mold would have the appropriate pattern, size and shape for receiving the particulate curable binder-abrasive particle mixture to form appropriately sized temporary structures. Inverting the mold onto an appropriate backing having a partially cured primer coating would provide the shaped structures which could then be conducted into an appropriately heated zone which would soften or melt the heated particulate curable binder and provide for bonding between adjacent abrasive particles. Clearly, this method would be much more cumbersome than the method depicted in FIG. 1 but it would be useful in providing the product of the invention. A further alternative method would involve first applying a uniform coating of the particulate curable binder-abrasive particle mixture onto the partially cured primer coating borne on the backing. A cookie cutter-like grid having openings corresponding to the desired shape of the bodies would then be impressed into the particle coating to provide areas of separation. This embodiment is depicted in FIGS. 12-14. The grid would then be carefully removed so as not to alter the shaped temporary structures on the backing. The backing bearing the temporary shaped structures would then be heated as described above to convert the temporary structures to permanent structures. Alternatively, the cookie cutter method, or even an embossing roll with a suitable pattern could be applied to a softened but uncured uniform layer of particulate curable binder-abrasive particle mixture. A yet further alternative method involves the additional step of imparting secondary patterning of the shaped softened temporary structures by calendering, embossing, etc. after initial shape(s) are imparted by any of the above techniques.

An alternative method to impart a random shape pattern with minimal space between features without using a cookie cutter grid or embossing technique would be to cure a uniform coating of the particulate curable binder-abrasive mixture, onto the partially cured primer coating on the backing. The sheet like abrasive product could easily be fractured to form individual random shapes separated by the fracture cracks but securely attached to the backing. This fracturing, commonly called flexing, increases the flexibility of the abrasive product. Other methods of making the product of the invention may also be possible and contemplated by those skilled in the art after reading the present disclosure.

FIG. 12 shows an alternative method of making the abrasive product of the invention. In FIG. 12, backing supply roll 61 dispenses backing 60 having an upper surface 62 and a bottom surface 63. Backing 60 is fed into a dispensing station 64 which includes particulate primer 66 and a knife edge coating blade 65 to deposit a thin coating of a particulate primer material onto backing 60. The primer material is heated with heater 69 and softened sufficiently to adhere to the upper surface 62 of the backing. A further coating station will supply a mixture 71 of particulate curable binder material and particulate abrasive particles onto the primer coated backing and passing this through coating station 70 beneath knife blade 68 to provide a relatively thick layer of the mixture of particulate abrasive particles and particulate curable binder particles on the primed surface of backing 60. The coating of particulate materials forms a solid continuous layer of particulate curable binder containing abrasive particles. This layer is in effect a sheet of particulate abrasive particles in particulate curable binder material which is then softened on heater 72. This coating is passed between chilled rolls 75 and 76, roll 75 being an embossing roll which is fitted with cutting edges to provide an embossed surface and a pattern of cuts as depicted in FIG. 13 to the continuous layer of abrasive particles and softened particulate curable binder material. The knife edges on roll 75 are tapered and are sufficient to cut the layer of softened particulate binder and abrasive to the backing to provide a collection of square bodies which are adjacent at the base and slightly separated at the top and this collection is then passed between heaters 77 and 78 to provide cured product 79. The knife edges on roll 75 may be eliminated if the embossing surface on roll 75 is sufficient to emboss the layer of abrasive particles and softened particulate binders in a pattern which extends to the backing. Cured product 79 is then taken up onto takeup roll 80 where it can be converted into further products. FIG. 13 is a top plan view of the product made by the process shown in FIG. 12. It will be noted that cut lines 81 and 82 intersect to provide square abrasive bodies on backing 60 as depicted in FIGS. 13 and 14. The shape of the cut bodies shown in FIG. 13 may be any of a variety of shapes. They can be also be elongate rectangles or triangular depending upon the design of the cutter blades. This product may be cut into disks or into strips to make abrasive belts. A further alternative would be to emboss a pattern with an embossing roll before the product is cured in the surface of the product which would not include the cut pattern depicted in FIGS. 13 and 14 to provide a structured abrasive surface having raised portions and depressed portions.

Figure 15:
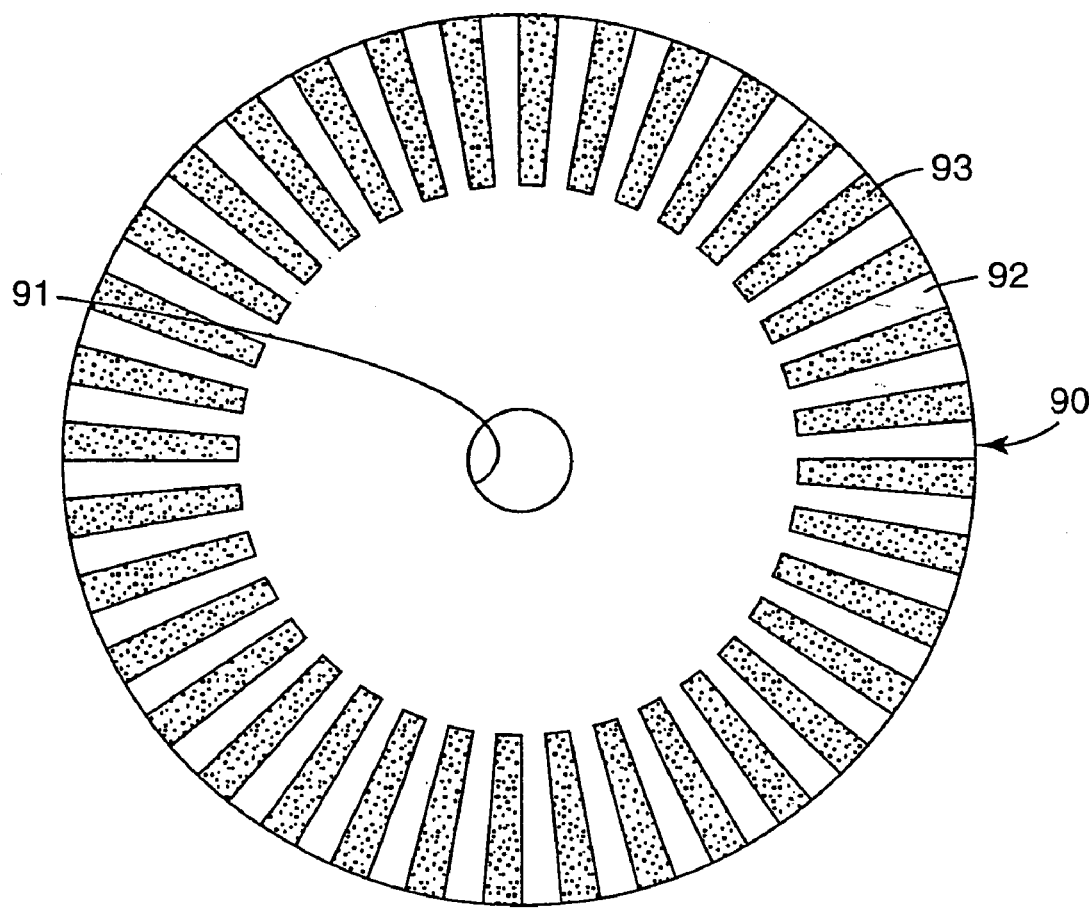
FIG. 15 is a plan view of a further disc-shaped product made by the process of the invention.
Figure 16:
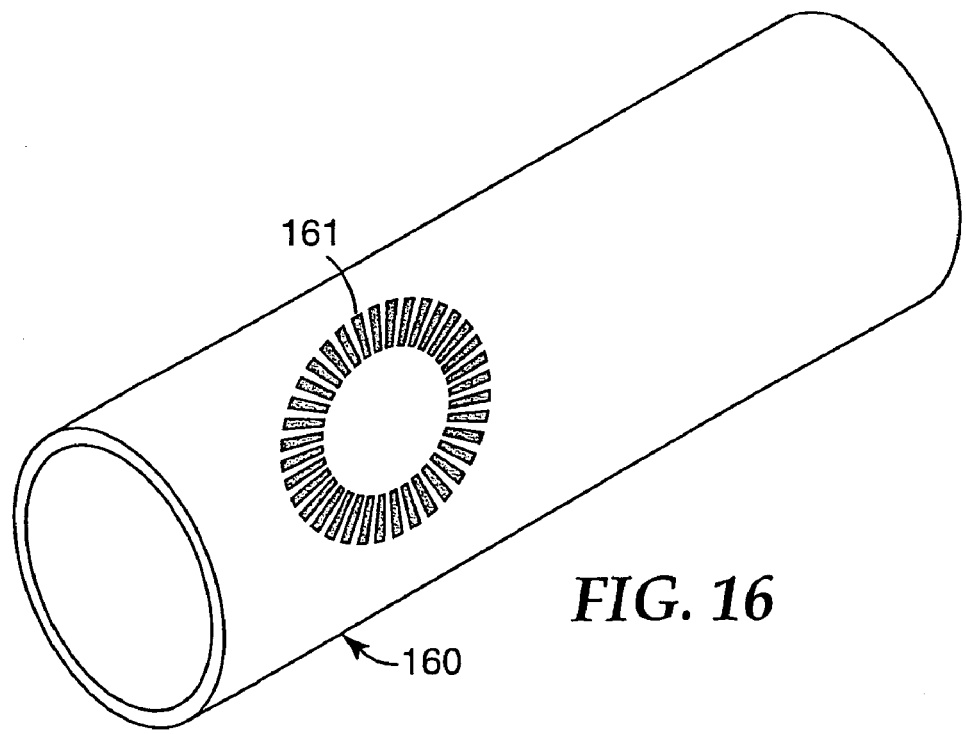
FIG. 16 shows a dispensing drum capable of depositing powder patterns of the type to make the product shown in FIG. 15.

FIG. 15 shows a top plan view of disc 90 which includes a central opening 91 for mounting, a circular backing 92 which includes on its periphery a plurality of spaced elongated abrasive bodies 93 deposited on the upper surface of backing 92 in a pattern to provide abrasive product which may be mounted on a tool and utilized on its periphery to abrade surfaces of any of a variety of products. The pattern of the powder depicted in FIG. 15 may be provided by utilizing the process depicted in FIG. 1, with drum 160 depicted in FIG. 16 which has a pattern of deposition openings 161 which are capable of providing the pattern depicted in FIG. 15.

Figure 17:
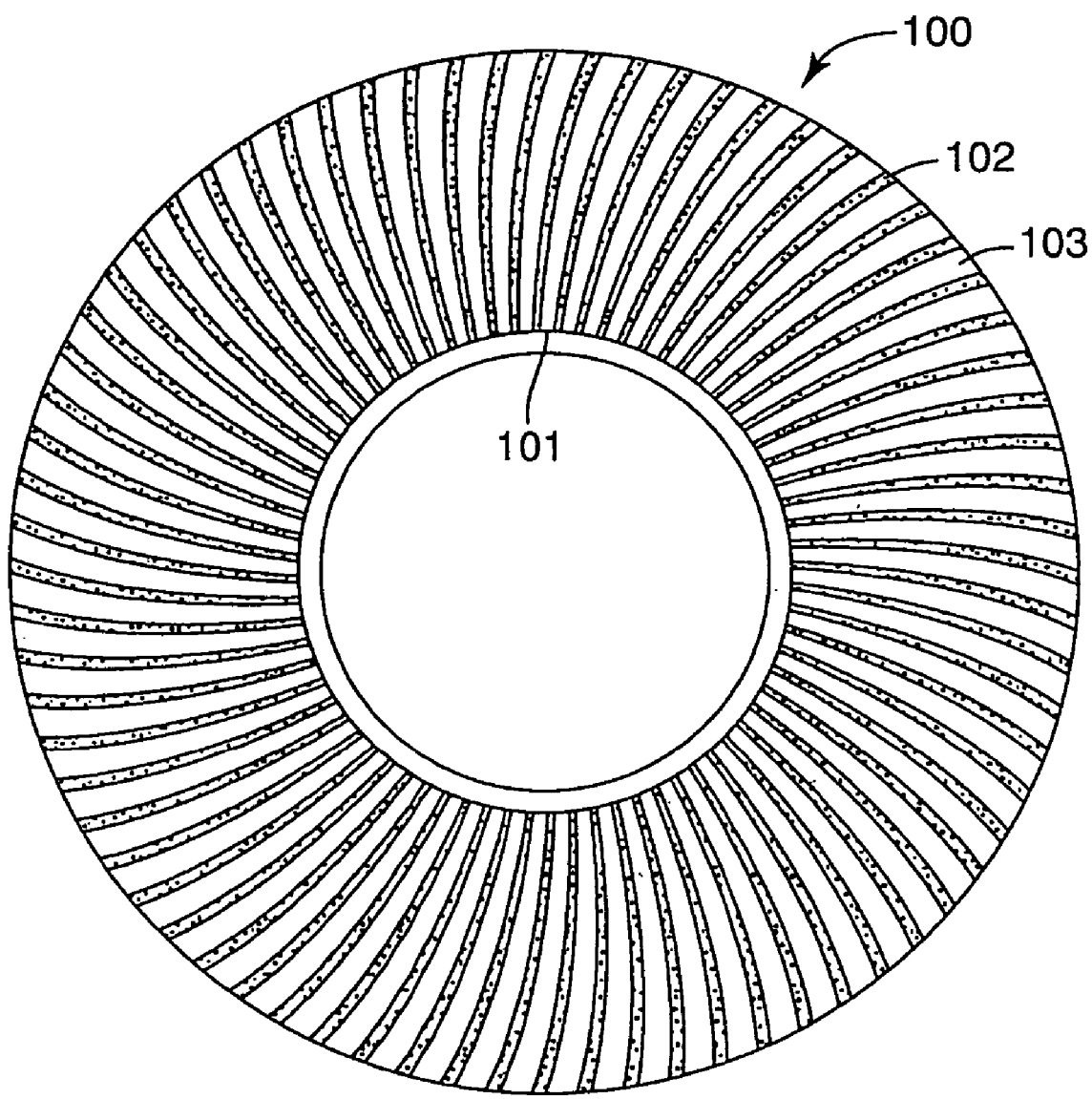
FIG. 17 shows a side view of a rotatable flap bearing abrasive product according to the invention.

FIG. 17 depicts a rotatable abrasive product 100 which has a core 101 to which are adhered rectangular cut sheets of the product of the present invention 102 and interleaved with strips of nonwoven abrasive product 103 to provide a rotatable flap roll. The interior ends of the flaps may be adhered to the outer surface of core 101 by any suitable adhesive material. If needed, support flanges on either side of the rotatable roll may be added on either side of roll 100 to provide further reinforcement and to prevent flap ejection.

Abrasive Particles

An abrasive product of the present invention typically comprises at least one shaped structure that includes a plurality of abrasive particles dispersed in cured particulate curable binder material. The abrasive particles may be uniformly dispersed in a binder or alternatively the abrasive particles may be non-uniformly dispersed therein. It is preferred that the abrasive particles are uniformly dispersed in the binder so that the resulting abrasive product has a more consistent cutting ability.

The average particle size of the abrasive particles can range from about 1 to 1800 μm (39 to 71,000 microinches), typically between 2 and 750 μm (79 to 30,000 microinches), and most generally between 5 and 550 μm (200 to 22,000 microinches). The size of the abrasive particle is typically specified to be the longest dimension of the abrasive particle. In most cases there will be a range distribution of particle sizes. In some instances it is preferred that the particle size distribution be tightly controlled such that the resulting abrasive article provides a consistent surface finish on the workpiece being abraded.

The preferred abrasive particles are selected from the group consisting of fused aluminum oxide, ceramic aluminum oxide, sol gel alumina-based ceramics, silicon carbide, glass, ceria, glass ceramics, fused alumina-zirconia, natural crushed aluminum oxide, heat treated aluminum oxide, zirconia, garnet, emery, cubic boron nitride, diamond, hard particulate polymeric materials, metals and combinations and agglomerates thereof.

Examples of conventional hard abrasive particles include fused aluminum oxide, heat treated aluminum oxide, white fused aluminum oxide, black silicon carbide, green silicon carbide, titanium diboride, boron carbide, tungsten carbide, titanium carbide, diamond (both natural and synthetic), silica, iron oxide, chromia, ceria, zirconia, titania, silicates, tin oxide, cubic boron nitride, garnet, fused alumina zirconia, sol gel abrasive particles and the like. Examples of sol gel abrasive particles can be found in U.S. Pat. Nos. 4,314,827 (Leitheiser et al.); 4,623,364 (Cottringer et al); 4,744,802 (Schwabel); 4,770,671 (Monroe et al.) and 4,881,951 (Wood et al.), all incorporated herein by reference.

The term abrasive particle, as used herein, also encompasses single abrasive particles bonded together with a polymer, a ceramic or a glass to form an abrasive agglomerate. Abrasive agglomerates are further described in U.S. Pat. Nos. 4,311,489 (Kressner); 4,652,275 (Bloecher et al.); 4,799,939 (Bloecher et al.), and 5,500,273 (Holmes et al.). Alternatively, the abrasive particles may be bonded together by inter-particle attractive forces.

The abrasive particle may also have a shape associated with it. Examples of such shapes include rods, triangles, pyramids, cones, solid spheres, hollow spheres and the like. Alternatively, the abrasive particle may be randomly shaped.

Abrasive particles can be coated with materials to provide the particles with desired characteristics. For example, materials applied to the surface of an abrasive particle have been shown to improve the adhesion between the abrasive particle and the polymer. Additionally, a material applied to the surface of an abrasive particle may improve the adhesion of the abrasive particles in the softened particulate curable binder material. Alternatively, surface coatings can alter and improve the cutting characteristics of the resulting abrasive particle. Such surface coatings are described, for example, in U.S. Pat. Nos. 5,011,508 (Wald et al.); 3,041,156 (Rowse et al.); 5,009,675 (Kunz et al.); 4,997,461 (Markhoff-Matheny et al.); 5,213,591 (Celikkaya et al.); 5,085,671 (Martin et al.) and 5,042,991 (Kunz et al.), the disclosures of which are incorporated herein by reference.

Fillers

An abrasive article of this invention may comprise abrasive structures which further comprise a filler. A filler is a particulate material of any shape, regular, irregular, elongate, plate-like, rod-shaped and the like with an average particle size range between 0.001 to 50 μm (0.039 to 1900 microinches), typically between 1 to 30 μm (39 to 1200 microinches). Fillers may function as diluents, lubricants, grinding aids or additives to aid powder flow. Examples of useful fillers for this invention include metal carbonates (such as calcium carbonate, calcium magnesium carbonate, sodium carbonate, magnesium carbonate), silica (such as quartz, glass beads, glass bubbles and glass fibers), silicates (such as talc, clays, montmorillonite, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, sugar, wood flour, aluminum trihydrate, carbon black, metal oxides (such as calcium oxide, aluminum oxide, tin oxide, titanium dioxide), metal sulfites (such as calcium sulfite), thermoplastic particles (such as polycarbonate, polyetherimide, polyester, polyethylene, poly(vinylchloride), polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metal fillers include, tin, lead, bismuth, cobalt, antimony, cadmium, iron and titanium. Other miscellaneous fillers include sulfur, organic sulfur compounds, graphite, lithium stearate and metallic sulfides.

Abrasive Structure Binders

The shaped structures of the abrasive products of this invention are formed from a particulate room temperature solid, softenable curable binder material in a mixture with abrasive particles. The particulate curable binder material preferably comprises organic curable polymer particles. The particulate curable polymers preferably are capable of softening on heating to provide a curable liquid capable of flowing sufficiently so as to be able to wet either an abrasive particle surface or the surface of an adjacent curable binder particle.

The particulate curable binder material used may be any suitable type consistent with the requirement that it is capable of providing satisfactory abrasive particle bonding and bonding to the primed backing surface by being activated or rendered tacky at a temperature which avoids causing heat damage or disfiguration to the primed backing to which it is to be adhered. The particulate curable binder materials meeting this criteria can be selected from among certain thermosetting particle materials, thermoplastic particle materials and mixtures of thermosetting and thermoplastic particle materials, as described herein.

The thermosetting particle systems involve particles made of a temperature-activated thermosetting resin. Such particles are used in a solid granular or powder form. The first or short-term effect of a temperature rise sufficiently above the glass transition temperature is a softening of the material into a flowable fluid-like state. This change in physical state allows the resin particles to mutually wet or contact the primed backing surface, abrasive particles and abrasive structures. In this softened state, the structures may be modified in shape by, for example, calendering or embossing. Prolonged exposure to a sufficiently high temperature triggers a chemical reaction which forms a cross-linked three-dimensional molecular network. The thus solidified (cured) resin particle locally bonds abrasive particles and structures to the surface of a primed backing. Useful particulate curable binder materials are selected from the group consisting of phenolic resins, epoxy resins, polyester resins, copolyester resins, polyurethane resins, polyamide resins and mixtures thereof. Useful temperature-activated thermosetting systems include formaldehyde-containing resins, such as phenol formaldehyde, novolac phenolics and especially those with added crosslinking agent (e.g., hexamethylenetetramine), phenoplasts, and aminoplasts; unsaturated polyester resins; vinyl ester resins; alkyd resins, allyl resins; furan resins; epoxies; polyurethanes; cyanate esters; and polyimides. Useful thermosetting resins include the thermosetting powders disclosed, for example, in U.S. Pat. Nos. 5,872,192 (Kaplan, et al.) and 5,786,430 (Kaplan, et al.) each of which is incorporated herein by reference.

In the use of heat-activated thermosetting fusible powders, the particulate curable binder material is heated to at least its cure temperature to optimize the backing and abrasive bonding. To prevent heat damage or distortion to the backing, the cure temperature of the fusible thermosetting particle preferably will be below the melting point, and preferably below the glass transition temperature, of the backing constituents.

Useful thermoplastic particulate curable binder materials include polyolefin resins such as polyethylene and polypropylene; polyester and copolyester resins; vinyl resins such as poly(vinyl chloride) and vinyl chloride-vinyl acetate copolymers; polyvinyl butyral; cellulose acetate; acrylic resins including polyacrylic and acrylic copolymers such as acrylonitrile-styrene copolymers; and polyamides (e.g., hexamethylene adipamide, polycaprolactum), and copolyamides.

In the case of semi-crystalline thermoplastic binder particles (e.g., polyolefins, hexamethylene adipamide, polycaprolactum), it is preferred to heat the binder particles to at least their melting point whereupon the powder becomes molten to form a flowable fluid. More preferably, the melting point of crystalline thermoplastic particulate curable binder material used will be one which is below the melting point and preferably below the glass transition temperature of the backing, or it can be brought into this range by incorporation of plasticizer. Where noncrystallizing thermoplastics are used as the fusible particles of the bonding agent (e.g., vinyl resins, acrylic resins), the powders preferably are heated above the glass transition temperature and rubbery region until the fluid flow region is achieved.

Mixtures of the above thermosetting and thermoplastic particle materials may also be used in the invention.

The size of the fusible organic particles used as the binder for the abrasive particle material is not particularly limited. In general, the particle size of the fusible organic particles are less than about 1000 μm (about 0.039 in) in diameter, preferably less than about 500 μm (about 0.020 in) in diameter. Generally, the smaller the diameter of the fusible organic particles, the more efficiently they may be rendered flowable because the surface area of the organic particles will increase as the materials are more finely divided.

Preferably, the amount of fusible organic particles applied to the primed substrate for purposes of binding the abrasive particle is adjusted to the amount consistent with providing firm bonding of the abrasive particles into the abrasive structures and the structures to the primed backing.

The amount of particulate curable binder material used in the particulate curable binder-abrasive particle mixture generally will be in the range from about 5 weight % to about 99 weight % particulate curable binder material, with the remainder about 95 weight % to about 1% comprising abrasive particles and optional fillers. Preferred proportions of the components in the mixture are about 10 to about 90 weight % abrasive particles and about 90 to about 10 weight % particulate curable binder material, and more preferably about 50 to about 85 weight % abrasive particles and about 50 to about 15 weight % particulate curable binder material. The permanent shaped structures may include voids which range from about 5 to about 60% by volume.

The particulate curable binder material may include one or more optional additives selected from the group consisting of grinding aids, fillers, wetting agents, chemical blowing agents, surfactants, pigments, coupling agents, dyes, initiators, energy receptors, and mixtures thereof. The optional additives may also be selected from the group consisting of potassium fluoroborate, lithium stearate, glass bubbles, inflatable bubbles, glass beads, cryolite, polyurethane particles, polysiloxane gum, polymeric particles, solid waxes, liquid waxes and mixtures thereof. Optional additives may be included to control particulate curable binder material porosity and erosion characteristics.

Backing

Any of a variety of backing materials are suitable for the abrasive article of the present invention, including both flexible backings and backings that are more rigid. Examples of typical flexible abrasive backings include polymeric film, primed polymeric film, metal foil, woven fabrics, knit fabrics, stitchbonded fabrics, paper, vulcanized fiber, nonwoven fabrics, calendered nonwoven fabrics, and treated versions thereof and combinations thereof. Suitable less flexible backings include vulcanized fibre, stiff polymeric backings, glass or metal fabrics or sheets, and metal or ceramic plates. The thickness of a backing generally ranges between about 0.03 to 50 mm (0.001 to 2 in) and preferably between 0.05 to 10 mm (0.002 to 0.39 in).

Alternatively, the backing may be fabricated from a porous material such as a foam, including open or closed cell foam, and combinations thereof.

Another example of a suitable backing is described in U.S. Pat. No. 5,417,726 (Stout et al.), incorporated herein by reference. The backing may also consist of two or more backings laminated together, as well as reinforcing fibers engulfed in a polymeric material as disclosed in U.S. Pat. No. 5,573,619 (Benedict et al.).

The backing may be a sheet-like structure that was previously considered in the art to be one part of a two-part attachment system. For example the backing may be a loop fabric, having engaging loops on the opposite second major surface and a relatively smooth first major surface. The shaped structures are adhered to the first major surface. Examples of loop fabrics include stitched loop, tricot loops and the like. Additional information on suitable loop fabrics may be found in U.S. Patent Nos. 4,609,581 (Ott) and 5,254,194 (Ott) both incorporated hereinafter by reference. Alternatively, the backing may be a sheet-like structure having engaging hooks protruding from the opposite second major surface and a relatively smooth first major surface. The shaped structures are adhered to the first major surface. Examples of such sheet-like structures with engaging hooks may be found in U.S. Pat. Nos. 5,505,742 (Chesley), 5,567,540 (Chesley), 5,672,186 (Chesley) and 6,197,076 (Braunschweig) all incorporated hereinafter by reference. During use, the engaging loops or hooks are designed to interconnect with the appropriate hooks or loops of a support structure such as a backup pad.

Other attachment means may also be provided, such as, for example, apertures to receive fastening members, pressure sensitive adhesive coatings, or the external application of adhesives, such as "glue sticks." Peripheral clamping may alternatively be employed.

Shaped Structures

The shaped structures may have any of a variety of shapes.

Heights may range from about 0.1 to about 20 mm (0.0039 to about 0.79 in), typically about 0.2 to about 10 mm (0.0079 to about 0.39 in) and preferably about 0.25 to about 5 mm (0.0098 to about 0.2 in).

The shaped structures may be bonded to the primed backing by any suitable primer material. In the event of multiple primer coatings (or tie coat layers), the composition of the subsequent coatings may be the same as or different from the previous primer coating. The primer coating may be absent if a suitable backing material is selected, for example, a backing comprising a melt-bondable fiber or a backing that has loops (knit backing) or needletacked fibers extending beyond the plane of the fabric that provides suitable adhesion to be shaped structures.

The backing may comprise a preformed melt bondable (i.e., laminating film) film in conjunction with the backing. This film may be used in place of a primer coating.

The temporary and permanent shaped structures of the abrasive products of this invention typically comprise a plurality of abrasive particles mixed with particulate curable binder material, but may include other additives such as coupling agents, fillers, expanding agents, fibers, antistatic agents, initiators, suspending agents, photosensitizers, lubricants, wetting agents, surfactants, pigments, dyes, UV stabilizers, powder flow additives and suspending agents. The amounts of these additives are selected to provide the properties desired.

The abrasive particle may further comprise surface modification additives including wetting agents (also sometimes referred to as surfactants) and coupling agents. A coupling agent can provide an association bridge between the polymer binder materials and the abrasive particles. Additionally, the coupling agent can provide an association bridge between the binder and the filler particles. Examples of coupling agents include silanes, titanates, and zircoaluminates.

In an alterative embodiment, the shaped abrasive structures may be made in a separate process and subsequently be disposed onto the surface of a suitably primed backing.

Shaped Structure Configuration

An abrasive article of this invention contains separated shaped structures which contain abrasive particles. The term "shaped" in combination with the term "structures" refers to both "precisely shaped" and "irregularly shaped" abrasive structures. An abrasive article of this invention may contain a plurality of such shaped structures in a predetermined array (ordered pattern) on a backing. Alternatively, the shaped structures may be in a random placement (random pattern) or an irregular placement on the backings.

The shape of the shaped structures may be any of a variety of geometric configurations. The base of the shape in contact with the backing may have a larger surface area than the distal end of the composite structure. The shaped structures may have a shape selected from the group consisting of cones, truncated cones, three-sided pyramids, truncated three-sided pyramids, four-sided pyramids, truncated four-sided pyramids, rectangular blocks, cubes, right cylinders, erect open tubes, hemispheres, right cylinders with hemispherical distal ends, erect ribs, erect ribs with rounded distal ends, polyhedrons and mixtures thereof. The shape of the structure may be selected from among any of a number of geometric shapes such as a prismatic, parallelepiped, pyramidal, or posts having any cross section. Generally, shaped structures have two (as for a cylinder or truncated cone), three, four, five or six surfaces, not including the base. The cross-sectional shape of the shaped structure at the base may differ from the cross-sectional shape at the distal end. The transition between these shapes may be smooth and continuous or may occur in discrete steps. The shaped structures may also have a mixture of different shapes. The shaped structures may be arranged in rows, spiral, helix, or lattice fashion, or may be randomly placed.

The sides forming the shaped structures may be perpendicular relative to the backing, tilted relative to the backing or tapered with diminishing width toward the distal end. A shaped structure with a cross section that is larger at the distal end than at the attachment end may also be used, although fabrication may be more difficult.

The height of each shaped structure is preferably the same, but it is possible to have shaped structures of varying heights in a single abrasive article. The height of the shaped structures generally may be less than about 20 mm (0.79 in), and more particularly in the range of about 0.25 to 5 mm (0.0098 to 0.2 in). The diameter or cross sectional width of the shaped structure can range from about 0.25 to 25 mm (0.01 to 0.98 in), and typically between about 1 to 10 mm (0.039 to 0.39 in).

The base of the shaped structures may abut one another or, alternatively, the bases of adjacent shaped structures may be separated from one another by some specified distance.

The packing of the abrasive composite structures may range from about 0.15 to 100 shaped structures/cm$^2$ (1 to 645 shaped structures/in$^2$) and preferably at least about 0.25 to 60 shaped structures/cm$^2$ (1.6 to 390 shaped structures/in$^2$). The linear spacing may be varied such that the concentration of structures is greater in one location than in another. The linear spacing of structures ranges from about 0.4 to about 10 structures per linear cm (about 1 to about 25 structures per linear in) and preferably between about 0.5 to about 8 structures per linear cm (about 1.3 to about 20 abrasive structures per linear in).

The percentage bearing area may range from about 5 to about 95%, typically about 10% to about 80%, preferably about 25% to about 75% and more preferably about 30% to about 70%. The percent bearing area is the sum of the areas of the distal ends times 100 divided by the total area, including open space, of the backing upon which the shaped structures are deployed.

The shaped structures are preferably set out on a backing in a predetermined pattern. Generally, the predetermined pattern of the structures will correspond to the pattern of the cavities on the perforated drum used to deposit the temporary structures on the backing. The pattern is thus reproducible from article to article.

In one embodiment, an abrasive product of the present invention may contain structures in an array. With respect to a single product, a regular array refers to aligned rows and columns of structures. In another embodiment, the structures may be set out in a "random" array or pattern. By this it is meant that the structures are not aligned in specific rows and columns. For example, the structures may be set out in a manner as described in U.S. Pat. No. 5,681,217 (Hoopman et al.). It is understood, however, that this "random" array is a predetermined pattern in that the location of the structures is predetermined and corresponds to the location of the cavities in the production tool used to make the abrasive article. The term "array" refers to both "random" and "regular" arrays.

Optional Additional Coatings

An alternative embodiment of the abrasive article of the present invention comprises an additional coating applied over at least a portion of the structures. Such coatings, also known as "size" coatings, may be compositionally the same as or different from that of the structures to which they are applied. Optional additional coatings may be particulate or liquid in nature, may be thermoplastic or thermosetting, may be inorganic or organic. Such coatings may be applied from solution, dispersion, or as 100% solids. Such coatings may or may not include additional abrasive particles, abrasive agglomerates, or abrasive composites. Examples of suitable coatings include reinforcing resins, lubricants, grinding aids, colorants, or other materials as such to modify the performance or appearance of the structures.

EXAMPLES

The invention is further illustrated by reference to the following examples wherein all parts and percentages are by weight unless otherwise stated.

TABLE 1

Materials

| Identification | Description |
| --- | --- |
| Powder A | A thermoset, copolyester, adhesive powder, commercially available from EMS-CHEMIE (North America) Inc., Sumter, SC under the trade designation GRILTEX D1644E P1 |
| Powder B | A thermoset copolyester adhesive powder, commercially available from EMS-CHEMIE (North America) Inc., Sumter, SC under the trade designation GRILTEX D1644E P1-P3 |
| Powder C | A thermoplastic copolyester adhesive powder, commercially available from EMS-CHEMIE (North America) Inc., Sumter, SC under the trade designation GRILTEX D1441E P1 |
| Powder D | A thermoplastic copolyester adhesive powder, commercially available from EMS-CHEMIE (North America) Inc., Sumter, SC under the trade designation GRILTEX 6E P1 |
| Powder E | A thermoplastic copolyamide adhesive powder, commercially available from EMS-CHEMIE (North America) Inc., Sumter, SC under the trade designation GRILTEX D1500A P82 |
| Powder F | A thermoplastic copolyamide adhesive powder, commercially available from Bostik, Middleton, MA under the trade designation BOSTIK 5216BE |

TABLE 1-continued

Materials

| Identification | Description |
| --- | --- |
| Powder G | A thermoset epoxy powder, commercially available from 3M Company, St. Paul, MN under the trade designation SCOTCHCAST 265 |
| Powder H | A phenolic novalak with hexa-methylene tetramine, commercially available from Rutgers-Plenco LLC, Sheboygan, WI under the trade designation 6109 FP |
| Powder I | A potassium fluoroborate, commercially available from Atotech USA Inc., Rock Hill, SC under the trade designation FLUOBORATE Spec. 104 |
| Powder J | A thermoset epoxy powder, commercially available from 3M Company, St. Paul, MN under the trade designation SCOTCHKOTE 6258 |
| Mineral A | A 36 grit ANSI graded aluminum oxide |
| Mineral B | A 120 grit FEPA graded aluminum oxide |
| Mineral C | A 120 grit FEPA graded silicon carbide |
| Mineral D | A 700 grit green silicon carbide commercially available from Fujimi Corporation, Elmhurst, IL under the trade designation GC 700 |
| Mineral E | A 3000 grit white aluminum oxide commercially available from Fujimi Corporation, Elmhurst, IL under the trade designation WA 3000 |
| Mineral F | A 320 grit FEPA graded aluminum oxide |
| Mineral G | A 80 grit FEPA graded aluminum oxide |
| Comparative Example A | An aluminum oxide, coated abrasive product commercially available from the 3M Company, St. Paul, MN under the trade designation 3M ™ MULTICUT A Cloth YF Wt., 369F, P120 |
| Comparative Example B | An aluminum oxide, coated abrasive product commercially available from the 3M Company, St. Paul, MN under the trade designation 3M ™ REGAL ™ Resin Bond Cloth YF Wt., 964F, P120 |
| Comparative Example C | A nonwoven abrasive product commercially available from the 3M Company, St. Paul, MN under the trade designation 3M ™ SURFACE CONDITIONING A-MED |
| Comparative Example D | A flap brush was made utilizing only the Scotch-Brite Type A Very fine web. Eight flaps were cut and placed in to each of the sixteen forming trays. The core, core adhesive, and forming techniques were as described in Example 20. |
| Comparative Example E | A flap brush was made utilizing eight flaps per forming tray of Type A-CRS Surface Conditioning Material (available from 3M Co., St. Paul, Mn). The core, core adhesive, and forming techniques were as described in Example 20. |
| Comparative Example F | A nonwoven abrasive product commercially available from the 3M Company, St. Paul, MN under the trade designation 3M ™ SURFACE CONDITIONING A-CRS |
| Comparative Example G | A nonwoven abrasive product commercially available from the 3M Company, St. Paul, MN under the trade designation 3M ™ SURFACE CONDITIONING SE A-CRS |
| Backing A | A woven, rayon fabric, available from Milliken and Company, Spartanburg, SC under the designation (101 × 62, 2.08 Yd./Lb., PFC TENCEL ™ LYOCELL JEANS, 1537 mm (60.5 in) Wide) |
| Backing B | A woven, rayon fabric, available from Milliken and Company, Spartanburg, SC under the designation (101 × 43, 1.15 Yd./Lb., Polyester Sateen, High Tenacity, Dry Heat Set 1416 mm (55.755 in) Wide) |
| Backing C | A woven, cotton fabric, available from Milliken and Company, Spartanburg, SC under the designation (68 × 46, 1.28 Yd./Lb., Open End Greige Cotton Drills, 1613 mm (63.5 in) Wide) |

Example 1

The particulate curable binder-abrasive particle mixture was formed by mixing 15 g (0.033 lb) of Powder A with 85 g (0.19 lb) of Mineral B. The particulate curable binder-abrasive particle mixture was thoroughly blended by shaking in a closed container for a period of time as determined by visual inspection. The primer mixture was a blend of 60 parts resin Powder C and 40 parts resin Powder A. The primer mixture was thoroughly blended by shaking in a closed container for a period of approximately 30 seconds. A 200 mm by 300 mm (8 in×12 in)piece of Backing A that had been dyed and stretched in its manufacture was placed on a metal plate of about the same size. A thin coating of the primer mixture was applied to Backing A by evenly spreading a small quantity of the primer mixture with a metal blade. The application of the primer mixture with this method yielded a layer approximately 0.05 to 0.15 mm (0.002 to 0.006 in) thick after a subsequent curing step. A perforated metal screen 1.27 mm (0.050 in) thick (obtained under the trade designation, "3/16 staggered" from Harrington and King Perforating Company, Chicago, Ill.) with 4.76 mm (0.1875 in) diameter holes on 6.35 mm (0.25 in) centers and 2.87 holes per square cm (18.5 holes per in$^2$) or 51% open area, was placed on top of Backing A coated with the primer mixture.

The particulate curable binder-abrasive particle mixture was then screeded with a metal blade into the holes of the perforated metal screen to cover the sample area and any excess mixture was removed. The perforated screen was carefully removed leaving temporary shaped structures of the particulate curable binder-abrasive particle mixture in the shape of the holes of the perforated screen. Backing A with primer coating and temporary shaped structures of the particulate binder-abrasive particle mixture was then carefully slid off the metal plate on to a 204° C. (400° F.) heated platen and allowed to cure for 4 minutes causing the temporary shaped structures to be changed into permanent shaped structures adhered to the cured primer coated Backing A.

The resultant Backing A containing the permanently shaped structures, cooled to room temperature, was then cut into strips approximately 38 mm by 216 mm (1½ in by 8½ in) and 127 mm (5 in) discs. The uncoated side of Backing A was then covered with a pressure sensitive adhesive tape having a protective liner (trade designation SCOTCH 9690, available from 3M Company, St. Paul, Minn.) useful for attachment to a sample holder for subsequent testing.

Examples 2-9

The method of preparation for these examples was similar to the procedure followed in Example 1 with the changes to the composition and cure time identified in Table 3.

Example 10

The preparation of this example was the same as the procedure followed in Example 1 except that 3 drops of a wetting agent (obtained under the trade designation "SANTICIZER 8" from Ferro Corporation, Cleveland, Ohio) was added to the 15 g (0.033 lb) of Powder B and thoroughly mixed, prior to the addition of Mineral A when making the particulate curable binder-abrasive particle mixture.

TABLE 2

| | Example # | | | | | | | | | |
|---|---|---|---|---|---|---|---|---|---|---|
| | 1 | 2 | 3 | 4 | 5 | 6 | 7 | 8 | 9 | 10 |
| Cure Time (Minutes @ 204° C. (400° F.)) | 4 | 2 | 2 | 4 | 7 | 3 | 4 | 4 | 3 | 4 |
| Resin Powder A | 15% | | | 17.5% | | | 15% | 20% | 40% | |
| Resin Powder B | | | | | | 15% | | | | |
| Resin Powder D | | 15% | | | | | | | | |
| Resin Powder E | | | 15% | | | | | | | |
| Resin Powder F | | | | | | | | | | 1.5% |
| Resin Powder G | | | | | 17.5% | | | | | |
| Resin Powder H | | | | | | | | | | 10.5% |
| Powder I | | | | 2.5% | | | | | | |
| Mineral A | | | | | | | 85% | | | |
| Mineral B | 85% | 85% | 85% | | 82.5% | | | | | 88% |
| Mineral C | | | | 80% | | 85% | | | | |
| Mineral D | | | | | | | | 80% | | |
| Mineral E | | | | | | | | | 60% | |

Example 11

An abrasive product was made as follows. A primer mixture was prepared by combining 600 g (1.3 lb) of Powder A and 900 g (2.0 lb) of powder C in a 7.5 liter (2 gal) plastic container. The cover to the container was secured and the mixture was thoroughly blended by agitation for 5 minutes. The particulate curable binder-abrasive particle mixture was prepared by combining 600 g (1.3 lb) of Powder A with 3400 g (7.5 lb) of mineral B. The mixture was thoroughly blended with an industrial mixer (obtained under the trade designation "TWIN SHELL DRY BLENDER" from Patterson Kelley Co. Inc, East Stroudsburg, Pa.) for 15 minutes. The particulate curable binder-abrasive particle mixture was directed to the hopper of a volumetric twin screw powder feeder. The volumetric feeder was adjusted to feed 142 g/min (0.31 lb/min) of the particulate curable binder-abrasive particle mixture into the back of a 15.2 cm (6 in) wide ×45.7 cm (18 in) long trough, the trough being part of a vibratory feeder (obtained under the trade designation "SYNTRON MAGNETIC FEEDER," Model FT 01-A, from FMC Corporation, Homer City, Pa.). The vibratory feeder was adjusted to provide a full width stream of the particulate curable binder-abrasive particle mixture received from the volumetric feeder. The vibratory feeder was additionally adjusted so that the flow of the particulate binder-abrasive particle mixture would be directed through the top of the perforated drum of the dispensing apparatus, allowing the mixture to fall downwards and onto the inside surface of the perforated drum of the dispensing apparatus so as to be collected against the upstream side of the wiper bar apparatus of the dispensing apparatus.

Backing A was unwound from a tension controlled unwind and threaded through the apparatus of this invention as illustrated in FIG. 1 and wound on a speed and tension controlled product winder. A portion of the primer mixture was deposited in a pile behind the knife coating blade of the primer dispensing apparatus. The knife coating blade was adjusted to a gap of 0.254 mm (0.010 in) above the Backing A to allow the primer powder to be deposited on the surface of the backing as it is carried forward. The wiper bar apparatus within the dispensing apparatus was adjusted to scrape the inside of the perforated drum component of the dispensing apparatus so as to not allow any significant amount of particulate curable binder-abrasive particle mixture to be carried beyond the wiper bar once in operation.

The 183 cm (72 in) primer heating platen was adjusted to provide a temperature profile over its 5 equal length heating zones with zone 1 set to 110° C. (230° F.) and zones 2 to 5 set to 121° C. (250° F.). The 457 cm (180 in) particulate curing platen was adjusted to provide a temperature profile over its 12 equal length heating zones with zones 1-2 set to 149° C. (300° F.); zone 3, 177° C. (350° F.); and zones 4-12, 204° C. (400° F.). In addition, a bank of infrared heaters (3 zones, each zone 1 meter long), located 5 cm (2 in) above the heated platen and starting about 1 meter from the front of the heated platen was set to a temperature of 232° C. (450° F.).

The perforated drum of the dispensing apparatus consisted of two support flanges and a 30.5 cm (12 in) diameter tube, the tube being 33 cm (13 in) long, having a wall thickness of 1.575 mm (0.062 in) and had a staggered round hole pattern as shown in FIG. 2, which is not drawn to scale. These holes were 4.76 mm (0.1875 in) in diameter on 6.35 mm (0.25 in) centers to create a pattern of about 2.87 holes/cm$^2$ (18.5 holes/in$^2$) or about a 51% open area. The tube was suspended between flanges that were connected to a shaft that allowed the perforated drum to rotate about the shaft while the wiper bar remained stationary. An external wiper bar with a rubber member contacting the outer surface of the perforated drum was used to wipe any excess mineral off the drum prior to contact with Backing A.

The process was started by turning on the product winder to provide take-up tension for the flexible Backing A and then bringing a rubber-covered drive roll into contact with Backing A against the perforated drum with sufficient pressure to ensure a positive drive of Backing A without deformation of the perforated drum. Tension from the unwind additionally ensured good contact of Backing A against the perforated drum of the dispensing apparatus. The rubber drive roll was turned on, which initiated the rotation of the perforated drum and caused flexible Backing A to be moved through the apparatus at a speed of about 113 cm/min (3.7 ft/min). The primer mixture was coated onto Backing A by the knife coating blade, and was sufficiently heated at the selected temperatures to partially fuse but not completely cure the mixture, such that the primer mixture visually appeared to retain its powdery nature but would not transfer from Backing A to any of the conveying rolls needed to control the web path. When the primer mixture covering Backing A was in contact with the perforated drum of the rotary screen printer, the flow of the particulate curable binder-abrasive particle mixture was initiated. The wiper bar was set to a position approximately near the horizontal tangent of the perforated drum and assisted in scraping the particulate curable binder-abrasive particle mixture through the holes of the drum onto Backing A. A small amount of particulate curable binder-abrasive particle mixture behind the wiper bar was maintained by the balance between the inlet flow of the particulate curable binder-abrasive particle mixture and the outlet flow through the perforations of the drum as determined by the linear speed of the coating operation. Backing A containing the deposited temporary shaped structures was then transferred to the metal surface of the particulate curing platen in a substantially horizontal path. Heat from the first zone of the particulate curing platen caused the temporary shaped structures to soften and become significantly more cohesive and much less sensitive to vibrations or motions. As Backing A containing the printed temporary shaped structures passed further along the particulate curing platen, the increasing contact time and temperatures caused the temporary shaped structures to be changed into permanent shaped structures. After leaving the particulate curing platen, Backing A containing the permanent shaped structures was air cooled and was subsequently wound into a roll by the winder. The individual permanent shaped structures were deposited in a staggered pattern about 12.7 cm (5 in) wide and were about 4.34 mm (0.171 in) in diameter as calculated from the average diameter of about at least 6 structures using a digital micrometer (obtained under the trade designation "Digit-Cal MK IV" from Brown and Sharpe, North Kingstown, R.I.). The shaped structures were about 1.3 mm (0.051 in) high as calculated from the average height of about at least 5 structures using an automated thickness tester (obtained under the trade designation "Model 49-70" from Testing Machines Inc, Amityville, N.Y.) and determined by taking the total thickness of the structures on top of Backing A and then subtracting the combined thickness of the primer mixture and Backing A. The individual structures weighed about 0.0308 g (0.001 oz) as calculated by taking the total weight of the structures, primer mixture and Backing A, subtracting the weight of the primer mixture and Backing A and then dividing by the number of structures on the sample area. This individual weight was then used to calculate the density and void volume of the shaped structures, which resulted in values about 1.6 g/cm$^3$ (0.058 lb/in$^3$) and a void volume of about 47%. The shaped structures had a Shore D hardness of about 71 as calculated from the average measurements of at least 10 structures using a hardness measuring gauge (obtained under the trade designation "Shore Type D" from Shore Instrument & Mfg. Co., Inc, Jamaica, N.Y.). The primer thickness was about 0.101 mm (0.004 in) as measured by taking the total thickness of the cured primer mixture on Backing A and then subtracting the thickness of Backing A itself. The resultant Backing A containing the permanent shaped structures was then cut into strips approximately 38 mm by 216 mm (1½ in by 8½ in) and 127 mm (5 in) discs. The uncoated side of Backing A was then covered with a pressure sensitive adhesive tape having a protective liner (trade designation SCOTCH 9690, available from 3M Company, St. Paul, Minn.) useful for attachment to a sample holder for subsequent testing.

Example 12

Example 12 was prepared in the same fashion as Example 11 except that a contact roll was introduced in the apparatus just prior to the bank of infrared heaters set to a temperature of 232° C. (450° F.) as illustrated in FIG. 1. At this point the more cohesive but still deformable shaped structures were passed beneath the cooled contact roll set at a gap of less than the thickness of the temporary shaped structures on Backing A. This contact roll caused a compression of the still deformable shaped structures, causing both a densification of the structures and leveling the distal ends of the structures. As Backing A containing the now leveled and densified structures was conveyed over the particulate curing platen at a speed of 113 cm/min (3.7 ft/min), the increasing contact time and temperatures caused the temporary shaped structures to be changed into permanent shaped structures. The individual permanent shaped structures were deposited in a staggered pattern about 15.2 cm (6 in) wide, were about 5.0 mm (0.197 in) in diameter and were about 0.79 mm (0.031 in) high. The individual structures weighed about 0.0311 g (0.0011 oz), which resulted in a density of about 2.01 g/cm$^3$ (0.073 lb/in$^3$) and a void volume of about 34%. The primer thickness was about 0.102 mm (0.004 in) thick. The shaped structures had a Shore D hardness of about 79.

Example 13

Example 13 was prepared in the same fashion as Example 11 except that the particulate curable binder-abrasive particle mixture was prepared by combining 700 g (1.5 lb) of Powder A with 3,300 g (7.3 lb) of mineral F. Backing A containing the shaped structures was cured while being conveyed at a speed of 137 cm/min (4.5 ft/min) and the bank of infrared heaters was set to a temperature of 232° C. (450° F.). The individual permanent shaped structures were deposited in a staggered pattern about 12 cm (4.75 in) wide, were about 4.76 mm (0.188 in) in diameter and were about 1.4 mm (0.055 in) high. The individual structures weighed about 0.0239 g (0.00084 oz), which resulted in a density of about 1.20 g/cm$^3$ (0.043 lb/in$^3$) and a void volume of about 61%. The primer thickness was about 0.152 mm (0.006 in) thick. The shaped structures had a Shore D hardness of about 63.

Example 14

Example 14 was prepared in the same fashion as Example 11 except that the primer mixture was prepared by combining 750 g (1.65 lb) of Powder A and 750 g (1.65 lb) of Powder D and the particulate curable binder-abrasive particle mixture was prepared by combining 700 g (1.5 lb) of Powder G with 3300 g (7.3 lb) of mineral B. Backing A containing the shaped structures was cured while being conveyed at a speed of 76 cm/min (2.5 ft/min) and the bank of infrared heaters was set to a temperature of 315° C. (600° F.). The individual permanent shaped structures were deposited in a staggered pattern about 12 cm (4.75 in) wide, were about 4.19 mm (0.165 in) in diameter and were about 1.27 mm (0.050 in) high. The individual structures weighed about 0.0408 g (0.0014 oz), which resulted in a density of about 2.33 g/cm$^3$ (0.084 lb/in$^3$) and a void volume of about 20%. The primer thickness was about 0.102 mm (0.004 in) thick. The shaped structures had a Shore D hardness of about 80.

Example 15

Example 15 was prepared in the same fashion as Example 11 except that the particulate curable binder-abrasive particle mixture was prepared by combining 600 g (1.3 lb) of Powder D with 3,400 g (7.5 lb) of mineral B. Backing A containing the shaped structures was cured while being conveyed at a speed of 116 cm/min (3.8 ft/min) and the bank of infrared heaters was set to a temperature of 274° C. (525° F.). The individual permanent shaped structures were deposited in a staggered pattern about 12 cm (4.75 in) wide, were about 4.44 mm (0.175 in) in diameter and were about 1.3 mm (0.051 in) high. The individual structures weighed about 0.0415 g (0.0015 oz), which resulted in a density of about 2.07 g/cm$^3$ (0.075 lb/in$^3$) and a void volume of about 32%. The primer thickness was about 0.152 mm (0.006 in) thick. The shaped structures had a Shore D hardness of about 66.

Example 16

Example 16 was prepared in the same fashion as Example 11 except that the screen of the rotary screen printer used as the dispensing apparatus consisted of a 30.5 cm (12 in) diameter tube, 33 cm (13 in) long having a wall thickness of 1.27 mm (0.050 in) and had a staggered hole pattern as described in FIG. 8. These perforated holes were 2.54 mm (0.100 in) wide, 7.62 mm (0.300 in) long, spaced 2.54 mm (0.100 in) apart in a row and the rows were on 5.08 mm (0.200 in) centers to create a pattern of about 1.94 holes/cm$^2$ (12.5 holes/in$^2$) or about a 38% open area. Backing A containing the shaped structures was cured while being conveyed at a speed of 146 cm/min (4.8 ft/min) and the bank of infrared heaters was set to a temperature of 232° C. (450° F.). The individual permanent shaped structures were deposited in a staggered pattern about 12 cm (4.75 in) wide, were about 6.83 mm (0.269 in) in length, were about 2.1 mm (0.083 in) in width and were about 1.14 mm (0.045 in) high. The individual structures weighed about 0.0333 g (0.0012 oz), which resulted in a density of about 1.82 g/cm$^3$ (0.066 lb/in$^3$) and a void volume of about 40%. The primer thickness was about 0.152 mm (0.006 in) thick. The shaped structures had a Shore D hardness of about 72.

Example 17

An abrasive product was made as follows: A primer mixture was prepared by mixing Powder A with Powder C in the weight ratio 40:60. The primer mixture was thoroughly blended in an industrial V-Blend mixer for 12 minutes. A particulate curable binder-abrasive particle mixture was formed by mixing Mineral B with Powder J and Powder I in the weight ratio of 78:15:7 The particulate curable binder-abrasive particle mixture was thoroughly blended in an industrial V-Blend mixer for 12 minutes.

The primer mixture was directed to the hopper of a volumetric single screw powder feeder. As shown in FIG. 1, a portion of the primer mixture was deposited into a trough-like hopper 16 attached to, and behind, the knife coating blade 15 of the primer dispensing apparatus 14. A gap of about 0.76 mm (0.030 in.) was maintained between the bottom of the hopper, which had an opening of about 1.27 cm (½ in.) wide and 17.8 cm (7 in.) long, and the Backing C beneath the hopper. The knife coating blade was adjusted to a gap of 0.254 mm (0.010 in) above the Backing C to allow the primer powder to be deposited on the surface of the backing as it was carried forward at a speed of about 91 cm/min (3 ft/min). A coating of the primer mixture was deposited on Backing C as described in Example 11 and fused at a temperature of 126° C. (260° F.). After leaving the primer curing platen, Backing C containing the partially fused primer was air cooled and subsequently wound into a roll 34 by a winder.

The apparatus of this invention was then rethreaded with Backing C containing the partially fused primer as described above. The particulate curable binder-abrasive particle mixture was directed to the trough-like hopper attached to the knife coating blade 15 of the primer dispensing apparatus 14. A gap of about 1.57 mm (0.062 in) was maintained between the bottom of blade 15 and the Backing C coated with the partially fused primer beneath the hopper. The knife coating blade 15 was adjusted to a gap of 1.39 mm (0.055 in) above the primer coated Backing C to allow the particulate curable binder-abrasive particle mixture to be deposited on the surface of the backing in a continuous layer as it was carried forward at a speed of about 91 cm/min (3 ft/min). A coating of the particulate curable binder-abrasive particle mixture was deposited on Backing C and fused at a temperature of 204° C. (400° F.) on both the primer curing platen and the particulate curing platen. After leaving the particulate curing platen, Backing C containing the permanent shaped surface was air cooled and subsequently wound into a roll 34 by a winder.

The resultant Backing C containing the permanent shaped surface, cooled to room temperature, was then cut into strips approximately 38 mm by 216 mm (1½ in by 8½ in) and 127 mm (5 in) discs. The uncoated side of Backing C was then covered with a pressure sensitive adhesive tape having a protective liner (trade designation SCOTCH 9690, available from 3M Company, St. Paul, Minn.) useful for attachment to a sample holder for subsequent testing. The sheet like abrasive product could easily be fractured to form individual random shapes separated by the fracture cracks but securely attached to the Backing A. This fracturing, commonly called flexing, increases the flexibility of the abrasive product.

Example 18

Example 18 was prepared in the same fashion as Example 11 except that the primer and particulate curable binder-abrasive mixtures were prepared as described in Example 17 and Backing B was used in place of Backing A. The particulate curable binder-abrasive particle mixture was formed by mixing Mineral F with Powder J in the weight ratio of 70:30. The primer mixture was dispensed as described in Example 17 and a mineral hopper with a conveying belt replaced the volumetric twin screw powder feeder and vibratory feeder used in Example 11. The screen of the rotary screen printer used as the dispensing apparatus consisted of a 30.5 cm (12 in) diameter tube, 33 cm (13 in) long having a wall thickness of 1.27 mm (0.050 in) and had a staggered hole pattern as described in FIG. 8. These perforated holes were 2.79 mm (0.110 in) wide, 8.38 mm (0.330 in) long, spaced 1.38 mm (0.055 in) apart in a row and the rows were on 4.19 mm (0.165 in) centers to create a pattern of about 2.74 holes/cm$^2$ (15.7 holes/in$^2$) or about a 57% open area. The shaped structures on Backing B were cured while being conveyed at a speed of 91 cm/min (3.0 ft/min) and no infrared heaters were used. The primer mixture was fused at 126° C. (260° F.) and the particulate curing platen was adjusted to provide a temperature of 204° C. (400° F.). The individual permanent shaped structures were deposited in a staggered pattern about 13.3 cm (5.25 in) wide, about 2.05 mm (0.081 in) in width, about 7.7 mm (0.303 in) in length and about 0.69 mm (0.027 in) high. The individual structures weighed about 0.0241 g (0.000849 oz), which resulted in a density of about 2.22 g/cm$^3$ (0.0801 lb/in$^3$) and a void volume of about 30%. The primer thickness was about 0.101 mm (0.004 in) thick. The shaped structures had a Shore D hardness of about 81.

Example 19

Example 19 was prepared in the same fashion as Example 17 except Backing B was used in place of Backing C and the particulate curable binder-abrasive particle mixture was directed to a second knife coating trough that was situated on the first zone of the particulate curing platen with the temperature controller turned off to allow a single overall coating process and the rethreading described in Example 17 was not necessary. The knife coating blade of this second knife coating station was adjusted to a gap of 1.67 mm (0.066 in) above the primer coated Backing B to allow the particulate curable binder-abrasive mixture to be deposited on the surface of the backing in a continuous layer as it was carried forward at a speed of about 91 cm/min (3 ft/min). Within 30 cm (12 in) downstream of the second knife coating station, the particulate curable binder-abrasive mixture became sufficiently fused in a thermoplastic fashion and was embossed with a patterned roll having a series of parallel, sharp, knife-like, outward facing blades, equally spaced 4.24 mm (0.167 in) apart on the circumference with each blade projecting 2.24 mm (0.088 in) of the 10.11 cm (3.981 in) overall diameter. The sheet of particulate curable binder-abrasive mixture was embossed by hand first in the machine direction of the moving web, and then perpendicular to the moving web but in the first embossed area. The hand pressure was sufficient to permit the knife blade to penetrate almost to the backing. The resultant embossed sheet was about 10.9 cm (4.32 in) wide after curing. The individual permanent shaped structures were about 4.0 mm (0.157 in) square and were about 0.83 mm (0.033 in) high.

The resultant Backing B containing the permanent shaped structures created by embossing was cooled to room temperature, and then was cut into strips approximately 38 mm by 216 mm (1½ in by 8½ in). The uncoated side of Backing B was then covered with a pressure sensitive adhesive tape having a protective liner (trade designation SCOTCH 9690, available from 3M Company, St. Paul, Minn.) to provide an article useful for attachment to a sample holder for subsequent testing. The embossed, sheet-like abrasive product could easily be fractured along the base of the embossed features to form individual features securely attached to the Backing B. This fracturing, commonly called flexing, increases the flexibility of the abrasive product.

Example 20

An experimental 203 mm (8 in) diameter flap brush as shown in FIG. 17 with an integral 76.2 mm (3 in) polymer core was prepared by alternating flaps of nonwoven abrasive product available under the trademark SCOTCH-BRITE Type A-Very Fine web (available from 3M Co., St. Paul, Minn.) and with flaps of Example 17. The flap brush was constructed by die cutting 63.5 mm (2.5 in) wide by 127 mm (5 in) long sections of web. Eight flaps of the nonwoven abrasive product (SCOTCH-BRITE) web were alternated with eight flaps of the experimental coated abrasive product of Example 17. This stack of flaps was placed between the platens of a press and the flap stack height reduced from about 76.2 mm (3 in) to about 19 mm (¾ in). The compressed stack of alternating flaps was then immediately placed in a forming tray before the stack of material regained its original loft. The forming tray was fabricated from 1.27 mm (0.05 in) metal sheet and is about 27 mm (1 1/16 in) wide with about 44.5 mm (1¾ in) side walls. Stacks of alternating sections were placed as described into 16 separate forming trays. The loaded forming trays were placed uniformly circumferentially into a mechanical device such that the web protruding from the forming trays produced an inside diameter of about 133.4 mm (5¼ in).

The polymer core utilized to make a brush having an 85.7 mm (3⅜ in) outside diameter by 76.2 mm (3 in) inside diameter with a glass fiber reinforced core (available from Strongwell, Chatfield, Minn.). Onto this core an epoxy resin line was hand spread to an approximate thickness of 4.76 mm (3/16 in). This core resin system was composed of a 1:1:0.037 weight ratio of curing agent (CAPCURE 3-800) (available from Cognis Corp., Kankakee, Ill.), a 50/50 by weight mixture of Dow DEN-438 and EPON 828 (available from Brenntag Great Lakes LLC, St. Paul, Minn.), and (CAPCURE EH-30) (Cognis Corp.). The core with uncured resin line was placed interior to the trays containing the stacked, compressed flap sections. The 16 trays with flaps were then mechanically pushed into the uncured resin line of the core and held in place. When the resin was cured, the metal trays were removed. From the resultant construction, a 203.2 mm (8 in) outside diameter by 76.2 mm (3 in) inside diameter by 38.1 mm (1.5 in) wide flap wheel was cut utilizing a rotating cutting wheel.

Example 21

A disc-shaped abrasive product was made as depicted in FIG. 15. The particulate curable binder-abrasive particle mixture was formed by mixing 30 g (0.066 lb) of Powder J with 65 g (0.14 lb) of Mineral G and 7 g (0.015 lb) of Powder I. The particulate curable binder-abrasive particle mixture was thoroughly blended by shaking in a closed container for a period of time as determined by visual inspection. The primer mixture was a blend of 30 parts resin Powder C and 70 parts resin Powder A. The primer mixture was thoroughly blended by shaking in a closed container for a period of approximately 30 seconds. A 200 mm by 300 mm (8 in×12 in) piece of Backing C that had been dyed and stretched in its manufacture was placed on a metal plate of about the same size. A thin coating of the primer mixture was applied to Backing C by evenly spreading a small quantity of the primer mixture with a metal blade. The application of the primer mixture with this method yielded a layer approximately 0.05 to 0.15 mm (0.006 to 0.010 in) thick after a subsequent curing step. Backing C with primer coating was then carefully slid off the metal plate onto a 204° C. (400° F.) heated platen and allowed to heat for 30 seconds, causing the primer layer to fuse. A methyl methacrylate plastic (PLEXIGLAS™) sheet 1.57 mm (0.062 in) thick with 88 tapered holes equally spaced in a circular pattern having an overall diameter of about 177.8 mm (7 in) was placed on top of Backing C coated with the fused primer mixture. The holes were about 1.88 mm (0.074 in) wide at the narrow end, about 3.35 mm (0.132 in) wide at the wide end and about 38.1 (1.50 in) long.

The particulate curable binder-abrasive particle mixture was then screeded with a metal blade into the holes of the methyl methacrylate plastic (PLEXIGLAS™) sheet to cover the sample area and any excess mixture was removed. The patterned methyl methacrylate plastic (PLEXIGLAS™) sheet was carefully removed, leaving temporary shaped structures of the particulate curable binder-abrasive particle mixture in the shape of the holes of the acrylic sheet. Backing C with primer coating and temporary shaped structures of the particulate binder-abrasive particle mixture was then carefully slid off the metal plate onto a 204° C. (400° F.) heated platen and allowed to cure for 10 minutes, causing the temporary shaped structures to be changed into permanent shaped structures adhered to the cured primer coated Backing C.

The resultant Backing C containing the permanent shaped structures, cooled to room temperature, was then covered on the uncoated side with a pressure sensitive adhesive tape having a protective liner (trade designation SCOTCH™ 9690, available from 3M Company, St. Paul, Minn.). The protective liner was removed and the composite attached to a 0.840 mm (0.032 in) thick semi-flexible vulcanized fiber backing available from NVF Company, Yorklyn, Del. The laminated material was then cut into a disc approximately 177.87 mm (7 in) diameter with a 22.2 mm (⅞ in) center hole.

Example 22

A piece of Example 24 was cut into strips approximately 38 mm by 216 mm (1½ in by 8½ in). The uncoated side of Example 24 was then covered with a pressure sensitive adhesive tape having a protective liner (trade designation SCOTCH™ 9690, available from 3M Company, St. Paul, Minn.) useful for attachment to a sample holder for subsequent testing. The coated side of the sample was then brushed with a dispersion of 4 parts water and 1 part of zinc stearate dispersion (Zinc Stearate Z-60 dispersion available from Witco Corporation, Memphis, Tenn). The sample was then dried in a hot air oven at 71° C. (160° F.) for about 30 minutes. Total dried add-on weight was approximately 0.07 g.

Example 23

A wet slurry of particulate curable binder-abrasive particle mixture was formed by mixing 150 gms (0.33 lbs) of water with 3 gms (0.007 lbs) of PS8300, a thickener available from EMS-Griltech, Sumter, S.C. and 3 gms (0.007 lbs) of PS8500, a dispersion stabilizer available from EMS-Griltech, Sumter, S.C. To this mixture 34 g (0.075 lb) of Powder J with 152 g (0.33 lb) of Mineral F and 14 g (0.03 lb) of Powder I. The particulate curable binder-abrasive particle slurry was thoroughly blended by mechanical stirring in a container for a period of time as determined by visual inspection. The primer mixture was a dry blend of 60 parts resin Powder C and 40 parts resin Powder A. The primer mixture was thoroughly blended by shaking in a closed container for a period of approximately 30 seconds. A 200 mm by 300 mm (8 in×12 in) piece of Backing C that had been dyed and stretched in its manufacture was placed on a metal plate of about the same size. A thin coating of the primer mixture was applied to Backing C by evenly spreading a small quantity of the primer mixture with a metal blade. The application of the primer mixture with this method yielded a layer approximately 0.05 to 0.15 mm (0.002 to 0.006 in) thick after a subsequent curing step. Backing C with primer coating was then carefully slid off the metal plate onto a 204° C. (400° F.) heated platen and allowed to heat for 30 seconds causing the primer layer to fuse. A perforated metal screen 1.27 mm (0.050 in) thick (obtained under the trade designation, "3/16 staggered" from Harrington and King Perforating Company, Chicago, Ill.) with 4.76 mm (0.1875 in) diameter holes on 6.35 mm (0.25 in) centers and 2.87 holes per square cm (18.5 holes per in$^2$) or 51% open area was placed on top of Backing A coated with the primer mixture.

The particulate curable binder-abrasive particle slurry was then screeded with a metal blade into the holes of the perforated metal screen to cover the sample area and any excess mixture was removed. The perforated screen was carefully removed, leaving temporary shaped structures of the particulate curable binder-abrasive particle mixture in the shape of the holes of the perforated screen. Backing C with primer coating and temporary shaped structures of the particulate binder-abrasive particle mixture was then dried for about one hour at 93° C. (200° F.). The dried sample was then placed onto a 204° C. (400° F.) heated platen and allowed to cure for 10 minutes.

The resultant Backing A containing the permanent shaped structures, cooled to room temperature, was then cut into strips approximately 38 mm by 216 mm (1½ in by 8½ in) and 127 mm (5 in) discs. The uncoated side of Backing C was then covered with a pressure sensitive adhesive tape having a protective liner (trade designation SCOTCH™ 9690, available from 3M Company, St. Paul, Minn.) useful for attachment to a sample holder for subsequent testing.

Example 24

Example 24 was prepared in the same fashion as Example 18 except that the particulate curable binder-abrasive mixture was formed by mixing Mineral B with Powder J and Powder I in the weight ratio of 78:15:7 and Backing C was used in place of Backing B. The primer mixture was fused at 129° C. (265° F.) and the particulate curing platen was adjusted to provide a temperature of 188° C. (370° F.). Backing C containing the shaped structures was partially cured while being conveyed at a speed of 213 cm/min (7.0 ft/min) over the particulate curing platen. Backing C containing the shaped structures was further cured in an industrial circulating air oven about 18.3 meters (60 ft) long, set at a temperature of 190° C. (374° F.) while being conveyed at a speed of 183 cm/min (6.0 ft/min). The individual permanent shaped structures were deposited in a staggered pattern about 16.5 cm (6.5 in) wide, were about 2.16 mm (0.085 in) in width, were about 8.3 mm (0.327 in) in length and were about 1.09 mm (0.043 in) high. The individual structures weighed about 0.038217 g (0.001347 oz), which resulted in a density of about 1.95 g/cm$^3$ (0.0801 lb/in$^3$) and a void volume of about 38%. The primer thickness was about 0.101 mm (0.004 in) thick. The shaped structures had a Shore D hardness of about 70.

Example 25

Example 25 was prepared in the same fashion as Example 18 except that the particulate curable binder-abrasive mixture was formed by mixing Mineral F with Powder J and Powder I in the weight ratio of 76:17:7 and Backing C was used in place of Backing B. The primer mixture was fused at 129° C. (265° F.) and the particulate curing platen was adjusted to provide a temperature of 188° C. (370° F.). Backing C containing the shaped structures was partially cured while being conveyed at a speed of 213 cm/min (7.0 ft/min) over the particulate curing platen. Backing C containing the shaped structures was further cured in an industrial circulating air oven about 18.3 meters (60 ft.), set at a temperature of 190° C. (374° F.) while being conveyed at a speed of 183 cm/min (6.0 ft/min). The individual permanent shaped structures were deposited in a staggered pattern about 16.5 cm (6.5 in) wide, were about 2.46 mm (0.097 in) in width, were about 8.3 mm (0.327 in) in length and were about 0.97 mm (0.038 in) high. The individual structures weighed about 0.032378 g (0.00114 oz), which resulted in a density of about 1.64 g/cm$^3$ (0.0801 lb/in$^3$) and a void volume of about 48%. The primer thickness was about 0.101 mm (0.004 in) thick. The shaped structures had a Shore D hardness of about 69.

Test Methods

Test Procedure I

Pre-weighed circular discs of 1010 carbon steel acting as a workpiece were mounted on an arbor of a mechanically driven, variable speed lathe having the revolutions per minutes of the arbor adjusted to generate a test speed of 1353 surface meters per minute (5035 surface feet per minute) at the outer edge of the revolving discs. Three discs, each approximately 203 mm (8 in) in diameter with a 31.75 mm (1.25 in) center hole and 4.75 mm (0.187 in), thick were ganged together on the arbor to form a solid thickness of 14.25 mm (0.561 in). A carriage containing a pre-weighed sample holder with a test specimen approximately 216 mm×38 mm (8.5 in×1.5 in) in size mounted on the surface was brought horizontally against the rotating discs such that the discs contacted the test specimen at a force of 22.2 Newtons (5 lb$_f$). The carriage was oscillated tangentially up and down with a stroke length of 127 mm (5 in) and a stroke speed of 66 mm (2.6 in) per second. Contact between the rotating workpiece and test specimen was maintained for 14 seconds, after which time contact was removed for 26 seconds. This sequence was repeated 10 times during a test sequence, after which time the weight loss of the test specimen and workpiece were determined. An average of three test specimens is reported for each test result. The results are reported in Table 3.

Test Procedure II

This test procedure differs from Test Procedure I in that the contact time between the workpiece and test specimen was 22 seconds, with the workpiece and test specimen being weighed after each cycle. This sequence was followed 15 times or until the test specimen was worn to the backing. The weight loss of the workpiece and test specimen are recorded in relation to the test cycle number, demonstrating performance of the abrasive over time. One test specimen is reported for each test result. The results are reported in Table 4.

Test Procedure III

This test method provided a measure of surface roughness imparted by the test specimens while being used under dry conditions to provide a finish to a workpiece. An orbital sander (an air powered, model 88S45W109 available from Ingersoll-Rand Corp., Woodcliff Lake, N.J.) using a 127 mm (5 in) diameter abrasive disc supported by an appropriate back-up pad, 3M STIKIT™ disc pad (part number 88740, available from 3M, St. Paul, Minn.) or 3M HOOKIT™ disc pad (part number 70417, available from 3M Co., St. Paul, Minn.) was set to abrade a metal workpiece (1018 carbon steel) using a disc speed of 4500 rpm, under a load of about 5 kg (11 lb) of weight, and held at about 5 degrees relative to the metal surface. The workpiece was mechanically traversed beneath the sander for a single 152.4 mm (6 in) pass completed in about 7 seconds.

The resulting surface roughness of the workpiece was determined by using a surface finish testing device available under the trade designation MAHR™ M4PI PERTHOMETER from Feinpruef Corp., Charlotte, N.C. Measurements were made transverse to the scratch patterns. The finish indices of Ra, the arithmetic mean of the departures of the profile from the meanline and Rz (also known as Rtm), which is the mean of the maximum peak-to-valley values, was recorded for each test.

In order to provide a consistent starting finish, the workpieces were first abraded with a coated abrasive disc, type 3M265L, 180 grit available from the 3M Co., St. Paul, Minn. for one pass. The average starting finish provided by this preconditioning was an Ra of 0.42 μm (16.9 microinches) and an Rz of 3.84 μm (151 microinches). The results are shown in Table 5.

Test Procedure IV

Pre-weighed circular discs of type 304 stainless steel acting as a workpiece were mounted on an arbor of a mechanically driven, variable speed lathe having the revolutions per minutes of the arbor adjusted to generate a test speed of 1353 surface meters per minute (5035 surface feet per minute) at the outer edge of the revolving discs. Two discs each approximately 203 mm (8 in) in diameter with a 31.75 mm (1.25 in) center hole and 16.38 mm (0.645 in), thick were ganged together on the arbor to form a solid thickness of 32.77 mm (1.29 in). A carriage containing a pre-weighed sample holder with a test specimen approximately 216 mm×38 mm (8.5 in×1.5 in) in size mounted on the surface was brought horizontally against the rotating discs such that the discs contacted the test specimen at a force of 17.8 Newtons (4 lb$_f$). The carriage was oscillated tangentially up and down with a stroke length of 127 mm (5 in) and a stroke speed of 66 mm (2.6 in) per second. Contact between the rotating workpiece and test specimen was maintained for 15 seconds, after which time contact was removed for 15 seconds. This sequence was repeated 10 times during a test sequence, after which time the weight loss of the test specimen and workpiece were determined. The number of specimens varied for each test result and is specified in Table 8.

Test Procedure V

A flap brush was mounted on a lathe, rotated at 1722 surface meters per minute (5650 surface feet per minute), and applied against grade 36 grit sandpaper to smooth the surface of the brush. The conditioned brush was removed from the lathe, and the brush weight recorded. The brush was remounted on the lathe. A 16 gauge 1008 cold rolled steel perforated screen, 50.8 mm (2 in) wide by 279 mm (11 in) long, with 3.97 mm (5/32 in) holes on 5.56 mm (7/32 in) centers (available from Harrington and King Perforating Co., Chicago, Ill.) was weighed and placed in a test piece holder. The test piece was reciprocated with a stroke of 140 mm (5.5 in) and a reciprocation speed of 25.4 mm (1 in) per second and applied to the rotating brush at a force of 44.4 newtons (10 lb$_f$) per brush width for 5 minutes. After the 5 minute test cycle, the perforated screen test piece was reweighed and the weight change recorded as grams cut. The test brush was removed from the lathe and the post test weight recorded. The brush efficiency defined as grams cut divided by brush weight loss was calculated and recorded.

Test Procedure VI

The abrasive discs were evaluated against the Comparative Examples using the test described below.

The workpiece for this test was a carbon steel bar 7.5 cm (3 in) in width×46 cm (18 in) in length×1.3 cm (½ in) in thickness. The steel bar was mounted on a bench with the 46 cm (18 in)×1.3 cm (½ in) face in contact with the bench. A 17.8 cm (7 in.) diameter test specimen was mounted onto a right-angle compressed air tool (capable of rotating at 6000 rpm under zero load) via a 17.8 cm (7 in.) back-up pad (3M Disc Pad Face Plate, part no. 051144-80514, 3M Company, St. Paul, Minn.). The comparative examples were mounted onto 3M Disc Holder No. 917. The operator reciprocally propelled the grinder assembly along the length of the workpiece at a rate of 32-36 cycles per minute, with the abrasive surface of the disc maintained at an angle of about 7 degrees to the workpiece, against the distal surface of the mounted steel workpiece for one-minute test cycles. The grinder assembly and the workpiece were urged together under the weight of the grinder assembly, which was 3.2 kg (7 lbs). The workpiece was weighed before and after each cycle to measure the cut. The test cycle was repeated until any part of the periphery, outer 1.3 cm (½ inch) of disc diameter of the working face of the disc, was worn down to the backing.

Test Results

Table 3 shows the comparative results for Examples 1-7 and 10-16 tested under Test Procedure I. Included in Table 3 are test results from Comparative Examples A, B, and C. Table 4 shows the comparative results for Examples 1 and 5 along with Comparative Examples A, B, and C tested under Test Procedure II.

As respectively shown in Table 3 and Table 5, similar workpiece cut, test specimen wear, and imparted surface roughness results are obtained via a sample prepared in a batch operation (Examples 1 and 5) and a sample prepared in a continuous operation (Examples 11 and 14). The broad range of cut and surface roughness values for Examples 1-10, respectively, shown in Tables 3 and 5 indicate abrasive products suitable for different applications. As would be expected, examples visually showing small amounts of wear during the test period experienced actual weight gains due to metal pickup on the test specimen from the workpiece.

The suitability of abrasive products made from this invention for a variety of applications may be obtained by variation of the abrasive size and type, a change in particulate curable binder material, ratio change of abrasive mineral to particulate curable binder material, the addition of a filler material or the addition of an additional coating. For example, an abrasive product producing a higher cutting action could be obtained with a larger mineral grit (Example 6) or by use of a different particulate binder material with the same mineral grit (Example 5 versus Example 1). Additionally, an abrasive product producing a lower surface roughness value may be obtained by decreasing the size of the abrasive grit (Example 13 versus Example 11) or change of the particulate binder material while maintaining the same abrasive grit (Example 1 versus Example 3). Alternatively, an abrasive product with more durability may be obtained by application of an additional coating as shown in the comparison between Example 24 and Example 22 or by increasing the amount of particulate binder material (Example 18 versus Example 25).

Additionally, Examples 11 and 12 demonstrate the change in performance that may be obtained by inclusion of a contact roll to densify the temporary shaped structures prior to conversion into permanent shaped structures. Compaction of the abrasive structures resulted a lower wear value, which could translate into a longer lasting abrasive product. Alternate process methods also may be used to produce the permanent shaped structures. The similar performance of Examples 17, 19 and 24 demonstrate the suitability of different methods to impart a topography to the working surface. Example 23 demonstrates the potential to use a wet process to produce a working abrasive product.

The aforementioned examples demonstrate that the grinding or finishing properties of the abrasive products made via this invention may be tailored to provide the desired removal of material from a surface and the need for a particular surface roughness. Table 4 demonstrates than not only does this invention provide the means to tailor the performance of the abrasive product, but also provides an unexpected means to improve the consistency of the cut and finish performance of abrasive products. Comparative Examples A and B provide high levels of initial cut, but rapidly decrease in cut as the product is used. Examples 1 and 5 exhibit a more consistent level of cut throughout the test sequence. Examples 1 and 5 also demonstrate a level of cut falling between coated abrasive products (Comparative Examples A and B) and surface conditioning products (Example C). Table 5 illustrates the decreased surface roughness of Examples 1 and 5 compared to the coated abrasive (Comparative Examples A and B) and surface conditioning abrasive (Comparative Example C). The products of this invention clearly bridge the cut and finish performance between coated abrasive products and surface conditioning products while providing consistent levels of performance throughout their useful life.

The consistency of the cut levels for Examples 1 and 5, as compared to Comparative Examples A, B and C, is shown in Table 6 and Table 7. The consistency of cut is demonstrated by comparing the average cut of the $11^{th}$ through the $15^{th}$ cut cycles for each example with the cut for the second cut cycle. Table 6 and Table 7 show that the average for Example 1 was 80.9%, Example 5 was 66.3%, Comparative Example A was 47.1% and Comparative Example B was 37.6%. The Examples of the invention typically have, on average, a cut for the $11^{th}$ through the $15^{th}$ cut cycles of at least 60%. The average cut for the $11^{th}$ through the $15^{th}$ cut cycle is calculated by adding the cut values for each cut cycle of the $11^{th}$ through the $15^{th}$ cut cycles and dividing the sum by 5.

The suitability of abrasive products made from this invention for a variety of applications may be obtained by alternative product constructions. Table 8 demonstrates the increase cut rate over traditional nonwoven flap brush constructions via incorporation of abrasive flaps constructed from this invention. Table 9 demonstrates the increased cut rate and extension in usable life from a right angle disc product made from this invention.

TABLE 3

Comparative Results Test Procedure I

| Example Number | Cut (grams per 10 cycles) | Wear (grams per 10 cycles) |
| --- | --- | --- |
| 1 | 1.39 | 0.13 |
| 2 | 0.62 | −0.20 |
| 3 | 0.30 | −0.17 |
| 4 | 0.37 | −0.01 |
| 5 | 2.65 | 0.69 |
| 6 | 6.99 | 1.27 |

TABLE 3-continued

Comparative Results Test Procedure I

| Example Number | Cut (grams per 10 cycles) | Wear (grams per 10 cycles) |
|---|---|---|
| 7 | 0.61 | 0.05 |
| 10 | 2.96 | 1.49 |
| Comparative Example A | 6.63 | 0.85 |
| Comparative Example B | 6.08 | 0.39 |
| Comparative Example C | 0.15 | −0.12 |
| 11 | 1.51 | 0.51 |
| 12 | 1.47 | 0.24 |
| 13 | 0.51 | 0.20 |
| 14 | 2.31 | 1.00 |
| 15 | 0.81 | −0.31 |
| 16 | 1.61 | 0.44 |

TABLE 4

Comparative Results Test Procedure II

| | Example 1 | | Example 5 | | Comparative Example A | | Comparative Example B | | Comparative Example C | |
|---|---|---|---|---|---|---|---|---|---|---|
| Cycle # | Cut (g) | Wear (g) | Cut (g) | Wear (g) | Cut (g) | Wear (g) | Cut (g) | Wear (g) | Cut (g) | Wear (g) |
| 1 | 0.35 | −0.01 | 0.54 | 0.15 | 1.29 | 0.25 | 1.23 | 0.12 | 0.03 | −0.04 |
| 2 | 0.23 | 0.04 | 0.35 | 0.09 | 0.87 | 0.13 | 0.75 | 0.06 | 0.02 | −0.01 |
| 3 | 0.17 | 0.02 | 0.21 | 0.05 | 0.94 | 0.08 | 0.69 | 0.03 | 0.01 | −0.01 |
| 4 | 0.24 | 0.03 | 0.27 | 0.06 | 0.84 | 0.10 | 0.58 | 0.05 | 0.00 | −0.01 |
| 5 | 0.21 | 0.06 | 0.20 | 0.09 | 0.87 | 0.09 | 0.58 | 0.04 | 0.02 | −0.01 |
| 6 | 0.12 | 0.03 | 0.32 | 0.10 | 0.69 | 0.07 | 0.43 | 0.03 | 0.02 | 0.03 |
| 7 | 0.22 | 0.02 | 0.21 | 0.07 | 0.67 | 0.09 | 0.40 | 0.02 | 0.00 | −0.04 |
| 8 | 0.18 | 0.03 | 0.29 | 0.06 | 0.69 | 0.07 | 0.49 | 0.07 | 0.03 | 0.02 |
| 9 | 0.21 | 0.03 | 0.34 | 0.07 | 0.62 | 0.05 | 0.34 | 0.00 | 0.02 | −0.02 |
| 10 | 0.18 | 0.04 | 0.26 | 0.05 | 0.55 | 0.06 | 0.37 | 0.00 | 0.02 | −0.01 |
| 11 | 0.20 | 0.05 | 0.27 | 0.04 | 0.38 | 0.04 | 0.30 | 0.01 | 0.01 | 0.02 |
| 12 | 0.13 | 0.01 | 0.23 | 0.04 | 0.55 | 0.05 | 0.26 | 0.03 | 0.01 | −0.02 |
| 13 | 0.19 | 0.06 | 0.28 | 0.04 | 0.51 | 0.05 | 0.35 | 0.01 | 0.00 | 0.00 |
| 14 | 0.19 | 0.02 | 0.14 | 0.04 | 0.32 | 0.04 | 0.18 | 0.01 | 0.03 | −0.02 |
| 15 | 0.22 | 0.02 | 0.24 | 0.01 | 0.29 | 0.01 | 0.32 | 0.03 | 0.00 | 0.00 |

TABLE 5

| Product | Finish, $R_a$, Micrometers | Finish, $R_z$, Micrometers | Change from Initial $R_a$, Micrometers | Change from Initial $R_z$, Micrometers |
|---|---|---|---|---|
| Example 1 | 0.29 | 4.30 | −0.13 | 0.46 |
| Example 2 | 0.22 | 3.09 | −0.21 | −0.75 |
| Example 3 | 0.18 | 2.89 | −0.25 | −0.95 |
| Example 4 | 0.27 | 3.60 | −0.15 | −0.24 |
| Example 5 | 0.40 | 4.67 | −0.02 | 0.84 |
| Example 6 | 2.42 | 18.68 | 2.00 | 14.83 |
| Example 7 | 0.37 | 3.37 | −0.05 | −0.47 |
| Example 8 | 0.34 | 2.71 | −0.08 | −1.13 |
| Example 9 | 0.38 | 3.00 | −0.04 | −0.84 |
| Example 10 | 0.83 | 7.91 | 0.41 | 4.07 |
| Comparative Example A | 2.24 | 19.33 | 1.82 | 15.50 |
| Comparative Example B | 1.49 | 10.64 | 1.06 | 6.80 |
| Comparative Example C | 0.74 | 6.73 | 0.32 | 2.89 |
| Example 11 | 0.35 | 2.90 | −0.07 | −0.94 |
| Example 12 | 0.45 | 5.24 | 0.03 | 1.40 |
| Example 13 | 0.13 | 1.46 | −0.29 | −2.38 |
| Example 14 | 0.58 | 4.93 | −0.16 | 1.09 |
| Example 15 | 0.27 | 2.55 | −0.15 | −1.29 |
| Example 16 | 0.31 | 3.64 | −0.11 | −0.20 |

TABLE 6

| | Example 1 | | | Example 5 | | |
|---|---|---|---|---|---|---|
| Cycle # | Cut (g) | % Cut 2nd Cycle | Wear (g) | Cut (g) | % Cut 2nd Cycle | Wear (g) |
| 1 | 0.35 | | −0.01 | 0.54 | | 0.15 |
| 2 | 0.23 | | 0.04 | 0.35 | | 0.09 |
| 3 | 0.17 | 73.91 | 0.02 | 0.21 | 60.00 | 0.05 |
| 4 | 0.24 | 104.35 | 0.03 | 0.27 | 77.14 | 0.06 |
| 5 | 0.21 | 91.30 | 0.06 | 0.2 | 57.14 | 0.09 |
| 6 | 0.12 | 52.17 | 0.03 | 0.32 | 91.43 | 0.1 |
| 7 | 0.22 | 95.65 | 0.02 | 0.21 | 60.00 | 0.07 |
| 8 | 0.18 | 78.26 | 0.03 | 0.29 | 82.86 | 0.06 |
| 9 | 0.21 | 91.30 | 0.03 | 0.34 | 97.14 | 0.07 |
| 10 | 0.18 | 78.26 | 0.04 | 0.26 | 74.29 | 0.05 |
| 11 | 0.2 | 86.96 | 0.05 | 0.27 | 77.14 | 0.04 |
| 12 | 0.13 | 56.52 | 0.01 | 0.23 | 65.71 | 0.04 |
| 13 | 0.19 | 82.61 | 0.06 | 0.28 | 80.00 | 0.04 |
| 14 | 0.19 | 82.61 | 0.02 | 0.14 | 40.00 | 0.04 |
| 15 | 0.22 | 95.65 | 0.02 | 0.24 | 68.57 | 0.01 |

TABLE 7

| Cycle # | Comparative Example A | | | Comparative Example B | | | Comparative Example C | | |
|---|---|---|---|---|---|---|---|---|---|
| | Cut (g) | % Cut 2nd Cycle | Wear (g) | Cut (g) | % Cut 2nd Cycle | Wear (g) | Cut (g) | % Cut 2nd Cycle | Wear (g) |
| 1 | 1.29 | | 0.25 | 1.23 | | 0.12 | 0.03 | | −0.04 |
| 2 | 0.87 | | 0.13 | 0.75 | | 0.06 | 0.02 | | −0.01 |
| 3 | 0.94 | 108.05 | 0.08 | 0.69 | 92.00 | 0.03 | 0.01 | 50.00 | −0.01 |
| 4 | 0.84 | 96.55 | 0.1 | 0.58 | 77.33 | 0.05 | 0 | 0.00 | −0.01 |
| 5 | 0.87 | 100.00 | 0.09 | 0.58 | 77.33 | 0.04 | 0.02 | 100.00 | −0.01 |
| 6 | 0.69 | 79.31 | 0.07 | 0.43 | 57.33 | 0.03 | 0.02 | 100.00 | 0.03 |
| 7 | 0.67 | 77.01 | 0.09 | 0.4 | 53.33 | 0.02 | 0 | 0.00 | −0.04 |
| 8 | 0.69 | 79.31 | 0.07 | 0.49 | 65.33 | 0.07 | 0.03 | 150.00 | 0.02 |
| 9 | 0.62 | 71.26 | 0.05 | 0.34 | 45.33 | 0 | 0.02 | 100.00 | −0.02 |
| 10 | 0.55 | 63.22 | 0.06 | 0.37 | 49.33 | 0 | 0.02 | 100.00 | −0.01 |
| 11 | 0.38 | 43.68 | 0.04 | 0.3 | 40.00 | 0.01 | 0.01 | 50.00 | 0.02 |
| 12 | 0.55 | 63.22 | 0.05 | 0.26 | 34.67 | 0.03 | 0.01 | 50.00 | −0.02 |
| 13 | 0.51 | 58.62 | 0.05 | 0.35 | 46.67 | 0.01 | 0 | 0.00 | 0 |
| 14 | 0.32 | 36.78 | 0.04 | 0.18 | 24.00 | 0.01 | 0.03 | 150.00 | −0.02 |
| 15 | 0.29 | 33.33 | 0.01 | 0.32 | 42.67 | 0.03 | 0 | 0.00 | 0 |

TABLE 8

| Brush Identification | Grams cut | Brush Efficiency |
|---|---|---|
| Example 20 | 29.86 | 0.415 |
| Comparative Example D | 1.56 | 0.081 |
| Comparative Example E | 3.46 | 0.852 |

TABLE 9

| Time (minutes) | Cut (g) Example 21 | Cut (g) Comparative Example F | Cut (g) Comparative Example G |
|---|---|---|---|
| 1 | 21.9 | 10.1 | 19.4 |
| 2 | 21 | 10 | 14.4 |
| 3 | 21.5 | | 13.6 |
| 4 | 20.8 | | 14 |
| 5 | 20.2 | | 13 |
| 6 | 19.6 | | |
| 7 | 17 | | |

TABLE 10

| Example Number | Cut (grams per 10 cycles) | Wear (grams per 10 cycles) | # of Samples Tested |
|---|---|---|---|
| 17 | 5.70 | 2.44 | 3 |
| 18 | 0.67 | 0.24 | 2 |
| 19 | 5.82 | 2.44 | 2 |
| 22 | 4.04 | 1.97 | 2 |
| 23 | 0.21 | 0.04 | 2 |
| 24 | 5.28 | 2.99 | 3 |
| 25 | 1.05 | 0.89 | 6 |

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

The invention claimed is:

1. A method of abrading a surface of a workpiece, said method comprising:
   a. providing an abrasive product comprising:
      i. a flexible backing having a first surface bearing a cured primer coating, an opposite second surface and opposite ends; and
      ii. a plurality of shaped structures each structure having a distal end bearing a shaped pattern spaced from said backing and an attachment end attached to the primer coating on the backing, said shaped structures comprising a three dimensional structure comprising abrasive particles locally bonded together by a continuous, cured organic particulate binder, wherein the three dimensional structure defines a network of interconnected voids;
   b. contacting the surface of the workpiece with the distal ends of the shaped structures; and
   c. relatively moving at least one of said workpiece or said abrasive product while providing sufficient force between the workpiece surface and the distal ends of the shaped structures of the abrasive product to abrade and/or otherwise modify the surface.

2. The method of claim 1 wherein the flexible backing of the abrasive product is selected from the group consisting of paper, woven fabrics, nonwoven fabrics, calendared nonwoven fabrics, polymeric films, stitchbonded fabrics, open cell foams, closed cell foams and combinations thereof.

3. The method of claim 1 wherein the abrasive product is comprised of a mixture of abrasive particles and particulate curable binder material which comprises about 5% by weight to about 99% by weight of particulate curable binder material and about 95% by weight to about 1 percent by weight abrasive particles.

4. The method of claim 1 wherein the abrasive particles are selected from the group consisting of fused aluminum oxide, ceramic aluminum oxide, sol gel alumina-based ceramics, silicon carbide, glass, ceria, glass ceramics, fused alumina-zirconia, natural crushed aluminum oxide, heat treated aluminum oxide, zirconia, garnet, emery, cubic boron nitride, diamond, hard particulate polymeric materials, metal, combinations and agglomerates thereof.

5. The method of claim 1 wherein the shaped structures have a shape selected from the group consisting of cones, truncated cones, three sided pyramids, truncated three sided pyramids, four sided pyramids, truncated four sided pyramids, rectangular blocks, cubes, right cylinders, erect open tubes, hemispheres, right cylinders with hemispherical distal ends, erect ribs, erect ribs with rounded distal ends, polyhedrons and mixtures thereof.

6. The method of claim 1 wherein said abrasive product has a shape selected from the group consisting of discs, rectangular sheets, belts, flap wheels, flap discs, wheels formed by compressing and bonding a stack of discs and wheels formed by spirally winding a sheet of material.

* * * * *